United States Patent
Shukuya

(10) Patent No.: US 11,876,940 B2
(45) Date of Patent: Jan. 16, 2024

(54) IMAGE FORMING APPARATUS

(71) Applicant: Yuichiro Shukuya, Kanagawa (JP)

(72) Inventor: Yuichiro Shukuya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 287 days.

(21) Appl. No.: 17/488,601

(22) Filed: Sep. 29, 2021

(65) Prior Publication Data

US 2022/0150376 A1 May 12, 2022

(30) Foreign Application Priority Data

Nov. 11, 2020 (JP) .................. 2020-187754

(51) Int. Cl.
*B41J 2/47* (2006.01)
*H04N 1/053* (2006.01)
(Continued)

(52) U.S. Cl.
CPC .............. *H04N 1/053* (2013.01); *B41J 2/473* (2013.01); *H04N 1/00018* (2013.01); *H04N 1/00037* (2013.01); *H04N 1/00082* (2013.01); *H04N 1/113* (2013.01); *G02B 26/12* (2013.01); *G02B 26/123* (2013.01); *G02B 26/127* (2013.01); *G03G 15/043* (2013.01)

(58) Field of Classification Search
CPC ..... B41J 2/473; H04N 1/053; H04N 1/00018; H04N 1/00037; H04N 1/00082; H04N 1/113; G02B 26/12; G02B 26/123; G02B 26/127; G03G 15/043
See application file for complete search history.

(56) References Cited

U.S. PATENT DOCUMENTS

2002/0063770 A1* 5/2002 Takesue .................. B41J 2/473
347/234
2011/0205324 A1* 8/2011 Shukuya .............. G03G 15/043
347/116
(Continued)

FOREIGN PATENT DOCUMENTS

JP 2016-009002 1/2016
JP 2017-062487 3/2017

*Primary Examiner* — Henok D Legesse
(74) *Attorney, Agent, or Firm* — Harness, Dickey & Pierce, P.L.C.

(57) ABSTRACT

An image forming apparatus includes a first medium scanned with a first signal, a second medium scanned with a second signal, a rotary polygon mirror that deflects the first and second signals, a synchronization signal generation circuit that generates a synchronization signal representing a time to start scanning the first medium, and at least one pseudo synchronization signal generation circuit that generates a pseudo synchronization signal with the synchronization signal. The pseudo synchronization signal represents a time to start scanning the second medium. Based on a previously calculated period of the synchronization signal and a period of the synchronization signal counted on a particular surface of the polygon mirror, the pseudo synchronization signal generation circuit generates a particular value for generating the pseudo synchronization signal. Based on the particular value, the pseudo synchronization signal generation circuit starts generating the pseudo synchronization signal when the synchronization signal is enabled.

16 Claims, 15 Drawing Sheets

(51) Int. Cl.
*H04N 1/113* (2006.01)
*H04N 1/00* (2006.01)
G02B 26/12 (2006.01)
G03G 15/043 (2006.01)

(56) References Cited

U.S. PATENT DOCUMENTS

2012/0033267 A1  2/2012  Yuuichiroh
2016/0018774 A1  1/2016  Abe et al.

* cited by examiner

IMAGE FORMING APPARATUS

CROSS-REFERENCE TO RELATED APPLICATION

This patent application is based on and claims priority pursuant to 35 U.S.C. § 119(a) to Japanese Patent Application No. 2020-187754, filed on Nov. 11, 2020 in the Japan Patent Office, the entire disclosure of which is hereby incorporated by reference herein.

BACKGROUND

Technical Field

The present invention relates to an image forming apparatus.

Description of the Related Art

An image forming apparatus such as a digital multifunction peripheral (MFP) or a laser printer is equipped with an optical scanning device that scans a surface of a photoconductor. The optical scanning device includes an optical deflector including a rotary polygon mirror for deflecting light emitted from a light source. Particularly in an image forming apparatus including a plurality of photoconductors, such as a color image forming apparatus, a mechanism with a scanning optical system including two scanning lenses positioned facing each other across an optical deflector is typically used as the optical scanning device. Such an optical scanning device is also called a counter optical scanning device.

For the plurality of photoconductors to have the same write start position in the main scanning direction in each scanning line, the counter optical scanning device includes a synchronization sensor that receives light at a predetermined position before the writing with the light. A signal output from the synchronization sensor is called a synchronization detection signal. In the counter optical scanning device, the synchronization sensor may be provided for a particular photoconductor of the plurality of photoconductors (e.g., photoconductor drums) to reduce the cost of the synchronization sensor, for example. In this case, there is a technique in which a pixel clock generating device for generating a pixel clock signal generates and uses a pseudo synchronization detection signal based on the synchronization detection signal to control the writing on the other photoconductors than the particular photoconductor.

The time of generating the pseudo synchronization detection signal, however, may change owing to uneven rotation rate of the rotary polygon mirror or accuracy variation between the surfaces of the rotary polygon mirror, for example. Such a change in the time of generating the pseudo synchronization detection signal results in a change in the image write start position in the main scanning direction, causing an anomalous image. To address the change in the time of generating the pseudo synchronization detection signal, there is a technique of executing feedback control such as proportional integral (PI) control with the period of the synchronization detection signal to correct the frequency of the pixel clock signal (a first pixel clock signal).

In the image forming apparatus using the feedback control to correct the frequency of the pixel clock signal in the generation of the pseudo synchronization detection signal, however, it takes a time corresponding to multiple periods of the synchronization detection signal to stabilize the output of the pixel clock signal, leaving room for improvement in responsiveness in the generation of the pseudo synchronization detection signal.

SUMMARY

In one embodiment of this invention, there is provided an improved image forming apparatus that includes, for example, a first scanned medium, a second scanned medium, a rotary polygon mirror, a synchronization detection signal generation circuit, and at least one pseudo synchronization detection signal generation circuit. The first scanned medium is scanned with a first optical signal based on first image data. The second scanned medium is scanned with a second optical signal based on second image data. The rotary polygon mirror deflects the first optical signal and the second optical signal. The synchronization detection signal generation circuit generates a synchronization detection signal representing a first scanning start time to start scanning the first scanned medium. The at least one pseudo synchronization detection signal generation circuit generates a pseudo synchronization detection signal with the synchronization detection signal. The pseudo synchronization detection signal represents a second scanning start time to start scanning the second scanned medium. Based on a previously calculated period of the synchronization detection signal and a period of the synchronization detection signal counted on a particular surface of the rotary polygon mirror, the at least one pseudo synchronization detection signal generation circuit generates a particular value for generating the pseudo synchronization detection signal. Further, based on the generated particular value, the at least one pseudo synchronization detection signal generation circuit starts generating the pseudo synchronization detection signal at a time at which the synchronization detection signal is enabled.

In one embodiment of this invention, there is provided an improved image forming apparatus that includes, for example, a first scanned medium, a second scanned medium, deflecting means, synchronization detection signal generation means, and pseudo synchronization detection signal generation means. The first scanned medium is scanned with a first optical signal based on first image data. The second scanned medium is scanned with a second optical signal based on second image data. The deflecting means deflects the first optical signal and the second optical signal. The synchronization detection signal generation means generates a synchronization detection signal representing a first scanning start time to start scanning the first scanned medium. The pseudo synchronization detection signal generation means generates a pseudo synchronization detection signal with the synchronization detection signal. The pseudo synchronization detection signal represents a second scanning start time to start scanning the second scanned medium. Based on a previously calculated period of the synchronization detection signal and a period of the synchronization detection signal counted on a particular surface of the deflecting means, the pseudo synchronization detection signal generation means generates a particular value for generating the pseudo synchronization detection signal. Further, based on the generated particular value, the pseudo synchronization detection signal generation means starts generating the pseudo synchronization detection signal at a time at which the synchronization detection signal is enabled.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
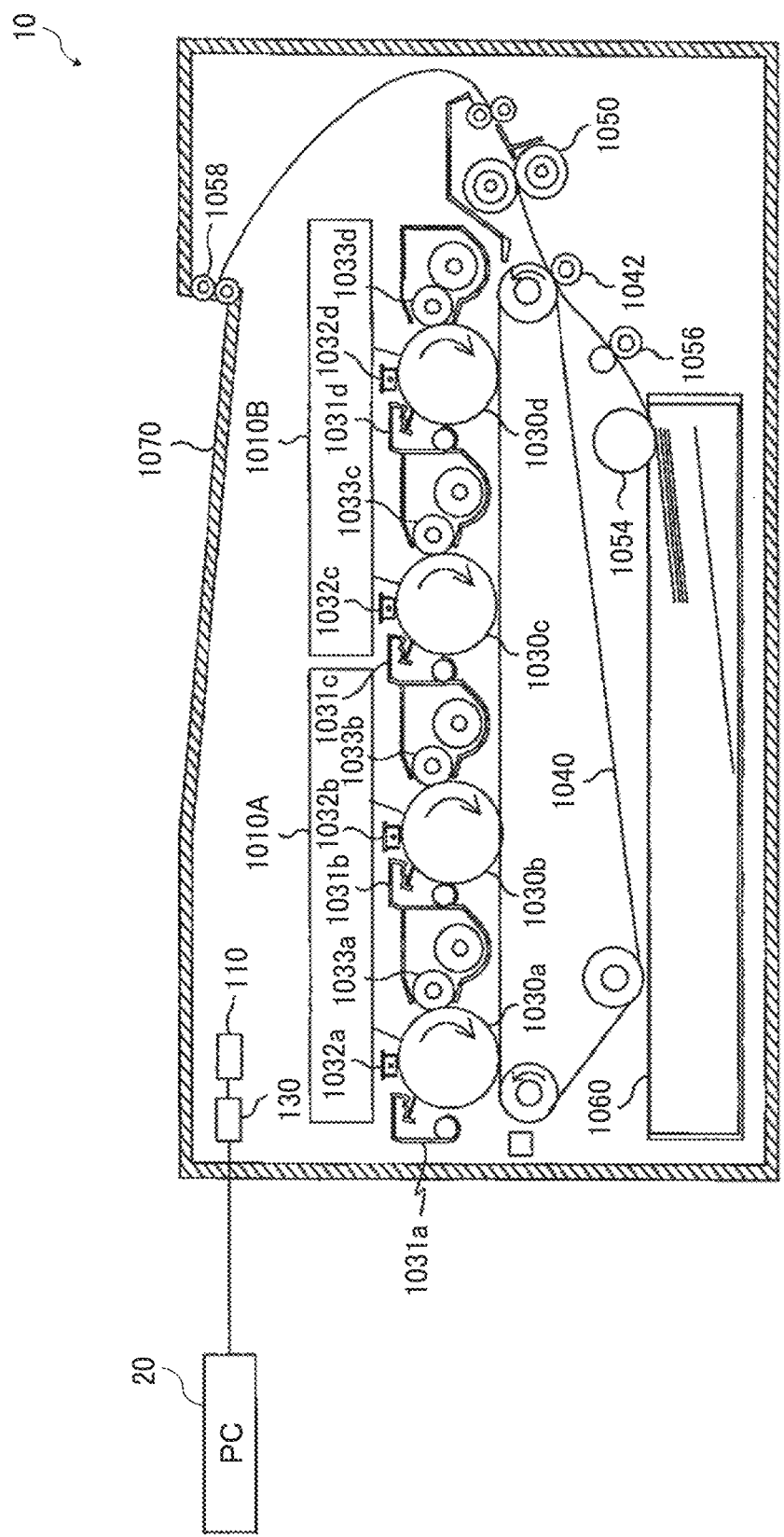
FIG. 1 is a diagram illustrating an example of the schematic configuration of a color image forming apparatus according to a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present invention will be described below with the accompanying drawings.

A schematic configuration of an image forming apparatus according to a first embodiment of the present invention will be described.

FIG. 1 is a diagram illustrating an example of the schematic configuration of a color image forming apparatus of the first embodiment. For example, an image forming apparatus 10 of the first embodiment is a tandem multicolor printer that forms a full-color image by superimposing toner images of four colors (black, cyan, magenta, and yellow) upon each other. The image forming apparatus 10 includes two optical scanning devices 1010A and 1010B (hereinafter simply referred to as the optical scanning devices 1010 unless otherwise specified). The image forming apparatus 10 further includes components used in an electrophotographic system, such as four photoconductor drums 1030a, 1030b, 1030c, and 1030d hereinafter simply referred to as the photoconductor drums 1030 unless otherwise specified), four cleaning devices 1031a, 1031b, 1031c, and 1031d (hereinafter simply referred to as the cleaning devices 1031 unless otherwise specified), four charging devices 1032a, 1032b, 1032c, and 1032d (hereinafter simply referred to as the charging devices 1032 unless otherwise specified), four developing rollers 1033a, 1033b, 1033c, and 1033d (hereinafter simply referred to as the developing rollers 1033 unless otherwise specified), a transfer belt 1040, a transfer roller 1042, fixing rollers 1050, a sheet feeding roller 1054, sheet ejection rollers 1058, a sheet feeding tray 1060, and a sheet ejection tray 1070, for example. The image forming apparatus 10 further includes a communication control device 130 and a printer control device 110 that performs overall control of the above-described components. In the present embodiment, the photoconductor drum 1030a is an example of a first scanned medium, and the photoconductor drum 1030b is an example of a second scanned medium. The photoconductor drum 1030c and the photoconductor drum 1030d may also be configured as an example of the first scanned medium and an example of the second scanned medium, respectively.

The communication control device 130 controls bidirectional communication between the image forming apparatus 10 and a personal computer (PC) 20, which is connected to the image forming apparatus 10 via a network, for example.

The printer control device 110, which is also called a print controller, includes a central processing unit (CPU), a read only memory (ROM), a random access memory (RAM), a hard disk (HD), a hard disk drive (HDD), and an application specific integrated circuit (ASIC) for printer control, for example. The CPU performs overall control of the printer control device 110. The ROM stores programs described in CPU-readable code and various data used in the execution of the programs. The RAM is a memory used in downloading the programs stored in the ROM and executing various commands and processes, for example. The printer control device 110 controls the above-described components in accordance with a request from the PC 20, for example. The respective configurations of the printer control device 110 and the communication control device 130 will be described in detail later with FIG. 2.

The photoconductor drum 1030*a*, the charging device 1032*a*, the developing roller 1033*a*, and the cleaning device 1031*a* are used as a unit, forming an image forming station for forming a black (K) image.

The photoconductor drum 1030*b*, the charging device 1032*b*, the developing roller 1033*b*, and the cleaning device 1031*b* are used as a unit, forming an image forming station for forming a cyan (C) image.

The photoconductor drum 1030*c*, the charging device 1032*c*, the developing roller 1033*c*, and the cleaning device 1031*c* are used as a unit, forming an image forming station for forming a magenta (M) image.

The photoconductor drum 1030*d*, the charging device 1032*d*, the developing roller 1033*d*, and the cleaning device 1031*d* are used as a unit, forming an image forming station for forming a yellow (Y) image.

Each of the photoconductor drums 1030 has a surface formed with a photoconductive layer. That is, the surface of the photoconductor drum 1030 is a scanned surface. The photoconductor drum 1030 has a cylindrical shape, and is rotated about the rotation axis thereof in a particular direction by a rotating mechanism.

Each of the charging devices 1032 uniformly charges the surface of the corresponding photoconductor drum 1030.

The optical scanning device 1010A scans each of the charged surfaces of the photoconductor drums 1030*a* and 1030*b* with light (e.g., laser light) modulated in accordance with the corresponding color based on black image information or cyan image information transmitted from the printer control device 110, for example. Thereby, a latent image according to the image information is formed on each of the surfaces of the photoconductor drums 1030*a* and 1030*b*. With the rotation of the photoconductor drums 1030*a* and 1030*b*, the latent images formed thereon in this process move toward the corresponding developing rollers 1033*a* and 1033*b*.

The optical scanning device 1010B scans each of the charged surfaces of the photoconductor drums 1030*c* and 1030*d* with light (e.g., laser light) modulated in accordance with the corresponding color based on magenta image information or yellow image information transmitted from the printer control device 110, for example. Thereby, a latent image according to the image information is formed on each of the surfaces of the photoconductor drums 1030*c* and 1030*d*. With the rotation of the photoconductor drums 1030*c* and 1030*d*, the latent images formed thereon in this process move toward the corresponding developing rollers 1033*c* and 1033*d*. In the present embodiment, the optical scanning devices 1010 may be included in an engine control device 140 illustrated in FIG. 2.

The surface of each of the photoconductor drums 1030 includes a scanning area in which the image information is written. The scanning area is also called an effective scanning area, an image forming area, or an effective image area, for example.

With the rotation of each of the developing rollers 1033, toner from a corresponding toner cartridge is applied to a surface of the developing roller 1033 in a thin uniform layer. When the toner on the surface of the developing roller 1033 comes into contact with the surface of the corresponding photoconductor drum 1030, the toner is transferred and adheres to light-irradiated areas on the surface of the photoconductor drum 1030. That is, the developing roller 1033 causes the toner to adhere to the latent image formed on the surface of the corresponding photoconductor drum 1030, developing the latent image into a visible image (i.e., a toner image). With the rotation of the photoconductor drum 1030, the visible image (i.e., a toner image) with the toner adhering thereto moves toward the transfer belt 1040.

The black, cyan, magenta, and yellow toner images are then sequentially transferred onto the transfer belt 1040 at respective predetermined times to be superimposed upon each other to form a color image.

The sheet feeding tray 1060 stores recording sheets. The sheet feeding roller 1054 disposed near the sheet feeding tray 1060 brings out the recording sheets one by one from the sheet feeding tray 1060. At a predetermined time, each of the recording sheets is sent out toward a gap between the transfer belt 1040 and the transfer roller 1042. Thereby, the color image on the transfer belt 1040 is transferred onto the recording sheet. The recording sheet with the color image transferred thereto is then transported to the fixing rollers 1050.

The fixing rollers 1050 apply heat and pressure to the recording sheet, thereby fixing the toner on the recording sheet. The recording sheet with the toner fixed thereon is transported to the sheet ejection tray 1070 via the sheet ejection rollers 1058. The thus-transported recording sheets are sequentially stacked on the sheet ejection tray 1070.

Each of the cleaning devices 1031 removes residual toner remaining on the surface of the corresponding photoconductor drum 1030. After the removal of the residual toner, the surface of the photoconductor drum 1030 returns to the position facing the corresponding charging device 1032.

An optical scanning device 2010 of a related-art image forming apparatus will be described in detail with FIG. 14.

Figure 14:
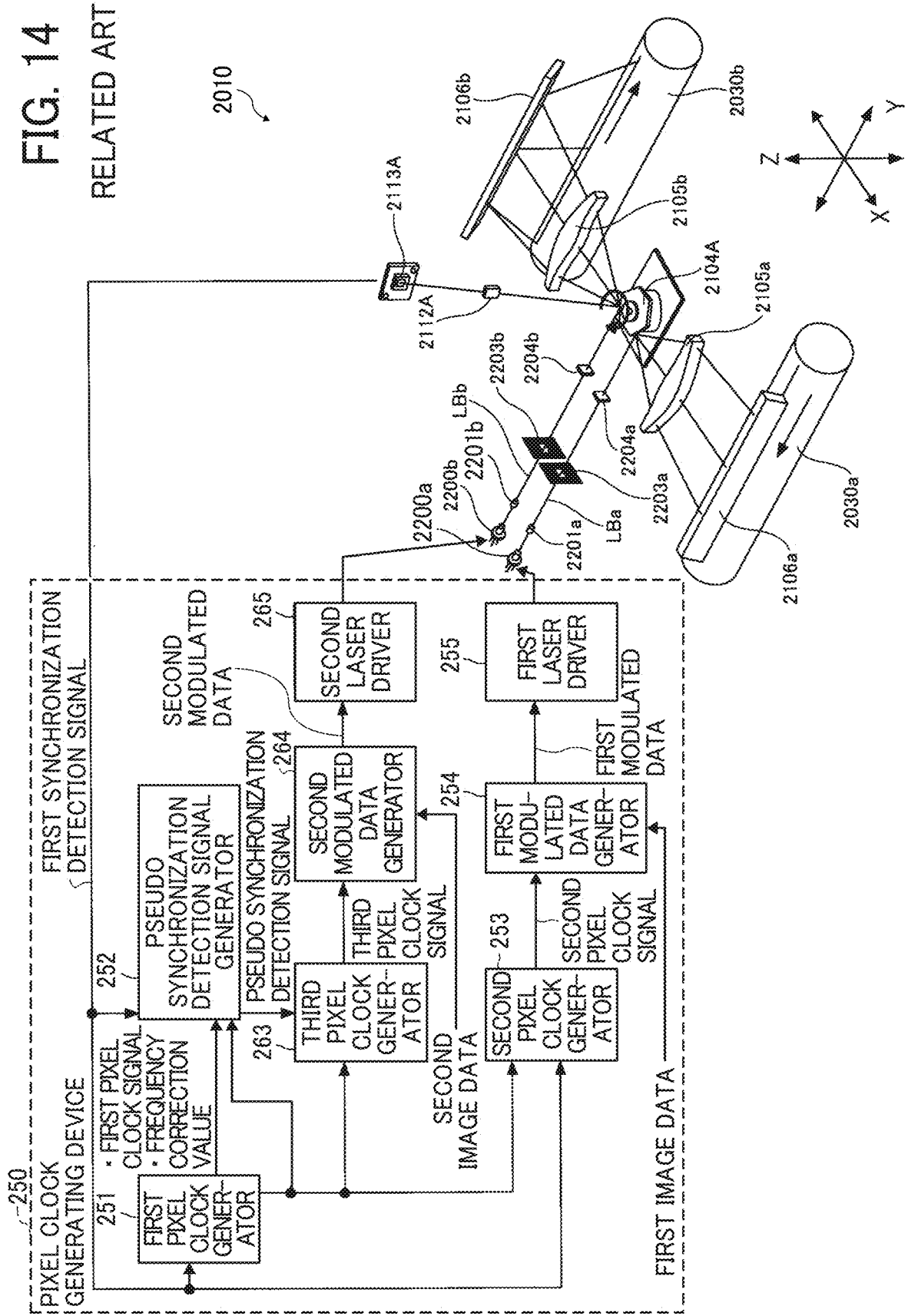
FIG. 14 is a diagram illustrating an example of the general arrangement of an optical scanning device included in a related-art image forming apparatus.

FIG. 14 is a diagram illustrating an example of the general arrangement of the optical scanning device 2010 included in the related-art image forming apparatus. The optical scanning device 2010 includes two light sources 2200*a* and 2200*b*, two coupling lenses 2201*a* and 2201*b*, two aperture plates 2203*a* and 2203*b*, two cylindrical lenses 2204*a* and 2204*b*, a polygon mirror 2104A, two scanning lenses 2105*a* and 2105*b*, two reflecting mirrors 2106*a* and 2106*b*, a condenser lens 2112A, a synchronization sensor 2113A, and a pixel clock generating device 250.

It is assumed in the following description that, in a three-dimensional XYZ orthogonal coordinate system, the X-axis direction is parallel to the direction in which photoconductor drums 2030*a* and 2030*b* are arranged, the Y-axis direction is parallel to the longitudinal direction of the photoconductor drums 2030*a* and 2030*b* (i.e., the direction of the rotation axes thereof), and the Z-axis direction is parallel to the rotation axis of the polygon mirror 2104A.

Each of the light sources 2200*a* and 2200*b* includes a semiconductor laser and a drive circuit that drives the semiconductor laser. The drive circuit of each of the light sources 2200*a* and 2200*b* is controlled by the pixel clock generating device 250. In the following description, the light beam emitted from the light source 2200*a* and the light beam emitted from the light source 2200*b* will be referred to as the laser beam LBa and the laser beam LBb, respectively, for the sake of convenience.

The coupling lens 2201*a* converts the laser beam LBa emitted from the light source 2200*a* into an approximately parallel light beam. The coupling lens 2201*b* converts the laser beam LBb emitted from the light source 2200*b* into an approximately parallel light beam.

The aperture plate 2203*a* has an aperture to adjust the diameter of the laser beam LBa passed through the coupling lens 2201*a*. The aperture plate 2203*b* has an aperture to adjust the diameter of the laser beam LBb passed through the coupling lens 2201*b*.

The cylindrical lens 2204*a* forms an image with the laser beam LBa passed through the aperture of the aperture plate 2203*a* such that the image is formed relative to the Z-axis direction near a deflecting and reflecting surface of the polygon mirror 2104A. The cylindrical lens 2204*b* forms an image with the laser beam LBb passed through the aperture of the aperture plate 2203*b* such that the image is formed relative to the Z-axis direction near a deflecting and reflecting surface of the polygon mirror 2104A.

An optical system formed by the components disposed between each of the light sources 2200*a* and 2200*b* and the polygon mirror 2104A is occasionally called a pre-deflector optical system.

The polygon mirror 2104A is a rotary polygon mirror with six mirrors each serving as a deflecting and reflecting surface. The polygon mirror 2104A as the rotary polygon mirror is driven by a polygon motor to rotate about the rotation axis of the polygon mirror 2104A at a constant velocity, thereby deflecting each of the laser beams LBa and LBb from the cylindrical lenses 2204*a* and 2204*b* at a constant angular velocity. It is assumed here that the polygon mirror 2104A rotates clockwise as viewed from above in FIG. 14. The polygon motor is controlled based on an external clock signal to rotate the polygon mirror 2104A at a rotation rate of 33300 revolutions per minute (rpm), for example. In this case, the polygon mirror 2104A makes one revolution per approximately 1.8 milliseconds (ms), for example.

The laser beam LBa from the cylindrical lens 2204*a* is incident on a deflecting and reflecting surface of the polygon mirror 2104A on the −X side (i.e., the lower left side in FIG. 14) of the rotation axis of the polygon mirror 2104A. The laser beam LBb from the cylindrical lens 2204*b* is incident on a deflecting and reflecting surface of the polygon mirror 2104A on the +X side (i.e., the upper right side in FIG. 14) of the rotation axis of the polygon mirror 2104A.

The scanning lens 2105*a* is disposed on the −X side of the polygon mirror 2104A to be on the optical path of the laser beam LBa deflected by the polygon mirror 2104A. The reflecting mirror 2106*a* guides the laser beam LBa passed through the scanning lens 2105*a* to the photoconductor drum 2030*a*. That is, the photoconductor drum 2030*a* is irradiated with the laser beam LBa, and an optical spot of a predetermined size is formed on the surface of the photoconductor drum 2030*a*.

The scanning lens 2105*b* is disposed on the +X side of the polygon mirror 2104A to be on the optical path of the laser beam LBb deflected by the polygon mirror 2104A. The reflecting mirror 2106*b* guides the laser beam LBb passed through the scanning lens 2105*b* to the photoconductor drum 2030*b*. That is, the photoconductor drum 2030*b* is irradiated with the laser beam LBb, and an optical spot of a predetermined size is formed on the surface of the photoconductor drum 2030*b*.

With the rotation of the polygon mirror 2104A, the optical spot on each of the surfaces of the photoconductor drums 2030*a* and 2030*b* moves in the longitudinal direction of the photoconductor drums 2030*a* and 2030*b*. The moving direction of the optical spot in this case corresponds to the main scanning direction, and the rotation direction of the photoconductor drums 2030*a* and 2030*b* corresponds to the sub-scanning direction.

The synchronization sensor 2113A is disposed at a position for receiving, via the condenser lens 2112A, the laser beam LBb directed to the outside of the effective scanning area on the surface of the photoconductor drum 2030*b*. The synchronization sensor 2113A outputs a synchronization detection signal to the pixel clock generating device 250.

The synchronization sensor 2113A outputs the synchronization detection signal at high level when the received light amount is less than a particular value, and outputs the synchronization detection signal at low level when the received light amount is equal to or greater than the particular value. That is, when the synchronization sensor 2113A receives light, the synchronization detection signal shifts to low level from high level.

Based on the synchronization detection signal output from the synchronization sensor 2113A, the pixel clock generating device 250 obtains the write start time to start writing on the photoconductor drum 2030*b*.

The laser beam LBb reflected by the polygon mirror 2104A is incident on the synchronization sensor 2113A, which is disposed near one end of the photoconductor drum 2030*b*, before being applied to the photoconductor drum 2030*b* to scan one line on the surface of the photoconductor drum 2030*b*. The synchronization sensor 2113A detects the scanning start time.

A signal representing the scanning start time detected by the synchronization sensor 2113A is input to a first pixel clock generator 251, a second pixel clock generator 253, and a pseudo synchronization detection signal generator 252 of the pixel clock generating device 250 as a first synchronization detection signal, which is a periodic signal timed with the scanning of the photoconductor drum 2030*b*.

A description will be given of a hardware configuration of the first pixel clock generator 251 forming the pixel clock generating device 250.

As illustrated in FIG. 14, the pixel clock generating device 250 includes the first pixel clock generator 251, the pseudo synchronization detection signal generator 252, the second pixel clock generator 253, a first modulated data generator 254, a first laser driver 255, a third pixel clock generator 263, a second modulated data generator 264, and a second laser driver 265. In the first pixel clock generator 251, the second pixel clock generator 253, and the third pixel clock generator 263 described above, "first," "second," and "third" are examples of an ordinal number ranging from 1 to N used to differentiate a plurality of pixel clock generators.

The first pixel clock generator 251 generates a first pixel clock signal and a frequency correction value based on the first synchronization detection signal. The pseudo synchronization detection signal generator 252 generates a pseudo synchronization detection signal based on the first synchronization detection signal and the first pixel clock signal. The second pixel clock generator 253 corrects an initially set frequency value with the frequency correction value, and generates a second pixel clock signal in synchronization with the first synchronization detection signal. The third pixel clock generator 263 corrects the initially set frequency value with the frequency correction value, and generates a third pixel clock signal in synchronization with the pseudo synchronization detection signal.

Based on first image data, the first modulated data generator 254 generates first modulated data synchronized with the second pixel clock signal, and outputs the generated first modulated data to the first laser driver 255. The first laser driver 255 drives the light source 2200a with the output according to the first modulated data, to thereby output the laser beam LBa from the light source 2200a.

Based on second image data, the second modulated data generator 264 generates second modulated data synchronized with the third pixel clock signal, and outputs the generated second modulated data to the second laser driver 265. The second laser driver 265 drives the light source 2200b with the output according to the second modulated data, to thereby output the laser beam LBb from the light source 2200b.

The rotation rate of a polygon mirror is not necessarily consistent, causing a periodic error. Further, the polygon mirror has a minute error in surface accuracy; the polygon mirror is not a perfect regular polyhedron. The period of the synchronization detection signal is therefore inconstant, causing differences in the period of the synchronization detection signal between scanning lines.

When the pseudo synchronization detection signal is used in the writing control, the frequency of the clock signal and the target value of a counter used to generate the pseudo synchronization detection signal are consistent irrespective of the differences in the period of the synchronization detection signal between scanning lines. Consequently, the period of the pseudo synchronization detection signal deviates from the actual period of the synchronization detection signal, causing a change in the image write start position in the main scanning direction.

Figure 15:
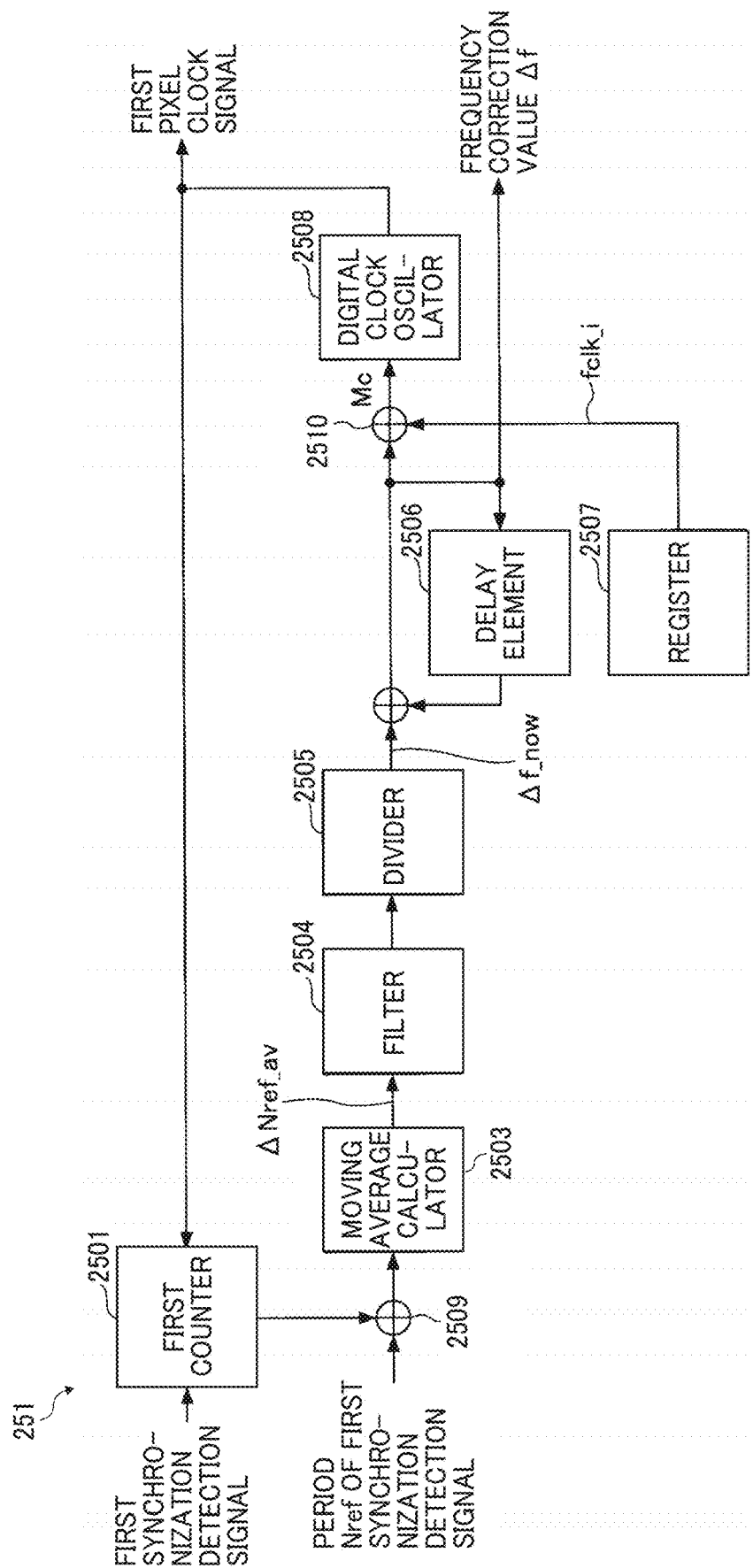
FIG. 15 is a diagram illustrating an example of the hardware configuration of a pixel clock generating device included in the related-art optical scanning device.

To address the above-described issue, there is a related-art method illustrated in FIG. 15. FIG. 15 is a diagram illustrating an example of the hardware configuration of the first pixel clock generator 251 of the related art. In FIG. 15, the first pixel clock generator 251 includes a first counter 2501, a moving average calculator 2503, a filter 2504, a divider 2505, a delay element 2506, a register 2507, a digital clock oscillator 2508, a comparator 2509, and an adder 2510.

In the first counter 2501, the interval (i.e., period) of the first synchronization detection signal, i.e., the interval in which one line in the main scanning direction corresponding to one surface (i.e., one deflecting and reflecting surface) of the polygon mirror 2104A is scanned, is counted with the first pixel clock signal. The comparator 2509 compares the counted value with a period Nref of the first synchronization detection signal for one surface of the polygon mirror 2104A (i.e., the standard value of the counted value counted with the first pixel clock signal for one surface of the polygon mirror 2104A), and inputs the difference between the counted value and the period Nref to the moving average calculator 2503.

The period Nref is expressed by equation (1) given below.

$$Nref = vL/E_R * \rho_m \rho_s / (25.4^2 * M) \quad (1)$$

Herein, $E_R$ represents the effective scanning period rate, v represents the linear velocity of the photoconductors, and L represents the effective writing width. Further, $\rho_m$ represents the pixel density in the main scanning direction, $\rho_s$ represents the pixel density in the sub-scanning direction, and M represents the number of writing beams.

For example, when the polygon mirror 2104A has four deflecting and reflecting surfaces, the moving average calculator 2503 calculates a moving average ΔNref_av of the differences for the four surfaces. The calculated value of the moving average ΔNref_av of the differences for the four surfaces is smoothed by the filter 2504, and the smoothed value is divided by the period Nref in the divider 2505 to obtain an error Δf_now in one pixel period. The delay element 2506 adds the error Δf_now in one pixel period to a frequency correction value Δf, which serves as a control value, to update the frequency. The adder 2510 outputs a sum Mc of the frequency correction value Δf_and an initial frequency fclk_i set by the register 2507, and the digital clock signal oscillator 2508 generates the first pixel clock signal.

With this feedback control, the error Δf_now in one pixel period is kept within a certain range. The frequency correction value Δf with which the error Δf_now in one pixel period falls within the certain range is supplied to the second pixel clock generator 253 and the third pixel clock generator 263. The value of the period Nref and the initial frequency fclk_i set by the register 2507 are determined by the effective scanning period rate $E_R$, the linear velocity v of the photoconductors, the effective writing width L, the pixel density $\rho_m$ in the main scanning direction, the pixel density $\rho_s$ in the sub-scanning direction, and the number M of the writing beams used in the image forming apparatus.

According to the clock signal generating method based on the above-described feedback control with the PI control using the delay element 2506 as an integrator, the feedback system feeds the difference between the counted value (i.e., the first count value) and the period Nref back to the frequency of the clock signal to correct the frequency of the clock signal such that the first count value approaches the period Nref. A typical feedback control system, however, repeats a cycle of feeding output back to input to make the output value gradually approach the target value. It is therefore difficult to obtain desired output with a single correction process; obtaining stable output normally involves multiple executions of the correction process.

Further, according to the above-described feedback control, the period of the first synchronization detection signal serves as the control period. The period of the first synchronization detection signal therefore corresponds to the line period of the output image. That is, the convergence time of the feedback control system directly affects the time taken to stabilize the image write start position. With an increase in the image resolution and the processing speed of the image forming apparatus, a delay in response time due to the feedback control is not negligible. As described above, according to the clock signal generating method based on the feedback control, it is difficult to keep the correction process in pace with the continuous change in the period of the synchronization detection signal. Consequently, an error is caused in the intended position for generating the pseudo synchronization detection signal, resulting in an anomalous image, for example.

Figure 2:
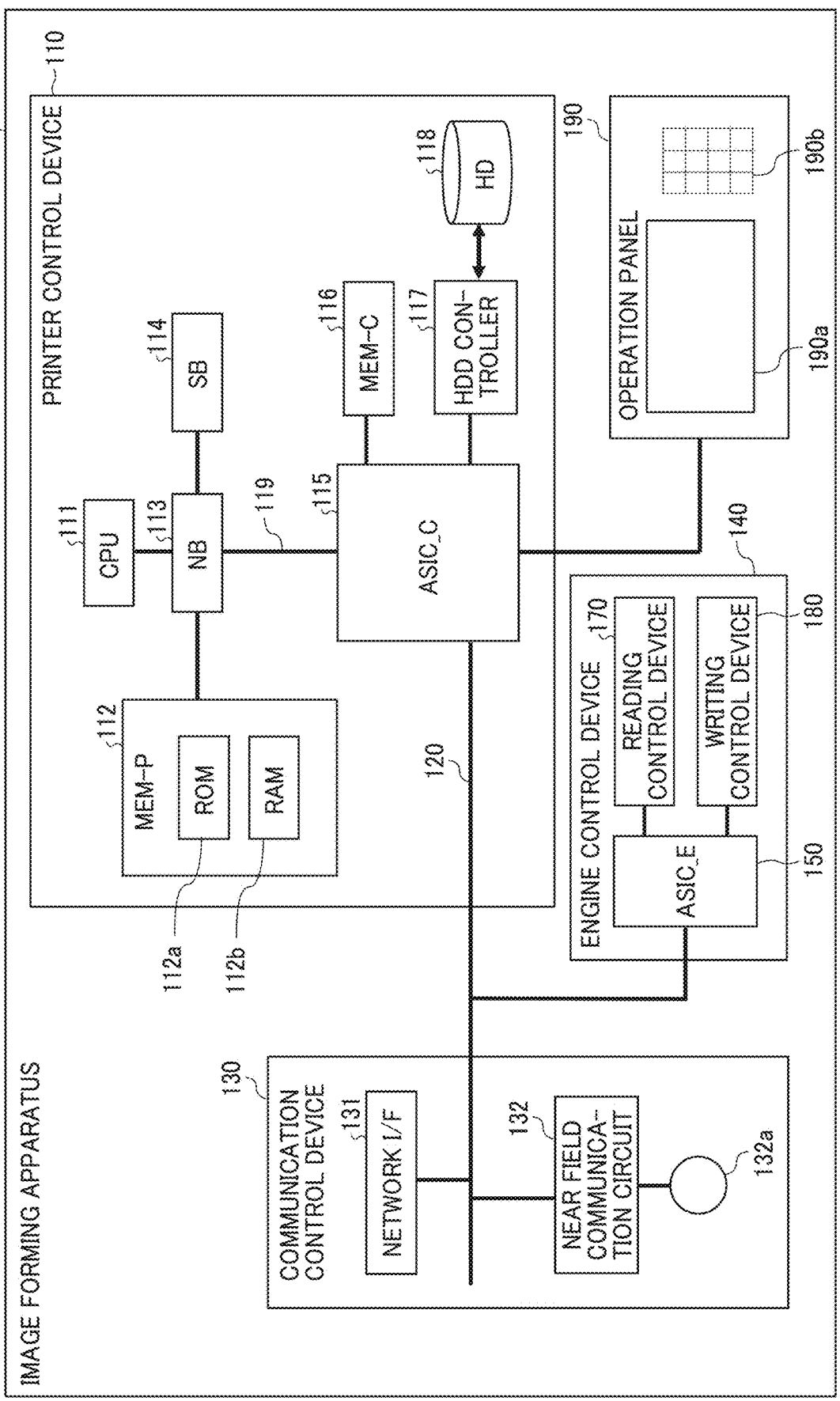
FIG. 2 is a diagram illustrating an example of the hardware configuration of the color image forming apparatus of the first embodiment.

In view of the above, the first embodiment presents a clock signal generating method to replace the above-described clock signal generating method based on the feedback control. FIG. 2 is a diagram illustrating an example of the hardware configuration of the color image forming apparatus 10 of the first embodiment. As illustrated in FIG. 2, the image forming apparatus 10 includes the printer control device 110, the communication control device 130, the engine control device 140, and an operation panel 190.

The printer control device 110 includes a CPU 111 as a major component of a computer forming the image forming apparatus 10, a system memory (MEM-P) 112, a north bridge (NB) 113, a south bridge (SB) 114, an ASIC_C 115 for controlling the printer control device 110 (i.e., the print controller), a local memory (MEM-C) 116 serving as a storage device, an HDD controller 117, and an HD 118 serving as a storage device. The NB 113 and the ASIC_C 115 are connected to each other by an accelerated graphics port (AGP) bus 119.

The CPU 111 is a control device that performs the overall control of the image forming apparatus 10. The NB 113 is a bridge for connecting the CPU 111, the MEM-P 112, the SB 114, and the AGP bus 119 to each other. The NB 113 includes a memory controller that controls data writing and reading to and from the MEM-P 112, a peripheral component interconnect (PCI) master, and an AGP target.

The MEM-P 112 includes a ROM 112a and a RAM 112b. The ROM 112a is a memory for storing programs and data for implementing the functions of the printer control device 110. The RAM 112b is used as a memory in deploying a program or data or as a rendering memory in memory printing, for example. Each of the programs stored in the ROM 112a may be provided as recorded on a computer readable recording medium, such as a compact disc-ROM (CD-ROM), a CD-recordable (CD-R), or a digital versatile disc (DVD), in an installable or executable file format.

The SB 114 is a bridge for connecting the NB 113 to a PCI device or a peripheral device. The ASIC_C 115 is an ASIC for image processing, which includes hardware components for image processing. The ASIC_C 115 functions as a bridge for connecting the AGP bus 119, a PCI bus 120, the HDD controller 117, and the MEM-C 116 to each other. The ASIC_C 115 includes a PCI target, an AGP master, an arbiter that arbitrates the driving time between various signals in the ASIC_C 115 in accordance with a particular priority order, a memory controller that controls the MEM-C 116, a plurality of direct memory access controllers (DMACs) that execute processes such as the rotation of image data with a hardware logic, and a PCI unit that transfers data to and from a reading control device 170 or a writing control device 180 of the engine control device 140 via the PCI bus 120. The ASIC_C 115 may be connected to an interface conforming to a standard such as universal serial bus (USB) or institute of electrical and electronics engineers (IEEE) 1394.

The MEM-C 116 is a local memory used as a copy image buffer and a code buffer. The HD 118 is a storage device for storing image data, font data for use in printing, and form data. The HDD controller 117 controls data writing and reading to and from the HD 118 under the control of the CPU 111. The AGP bus 119 is a bus interface for a graphics accelerator card proposed to speed up graphics processing. The AGP bus 119 enables the graphics accelerator card to directly access the MEM-P 112 with a high throughput, thereby implementing a high-speed graphics accelerator card.

The communication control device 130 includes hardware components including a network interface (I/F) 131, a near field communication circuit 132, and an antenna 132a. The near field communication circuit 132 is a communication circuit conforming to a standard such as near field communication (NFC) or Bluetooth (registered trademark).

The engine control device 140 includes hardware components including the reading control device 170, the writing control device 180, and an ASIC_E 150. The reading control device 170 and the writing control device 180 form an engine of the image forming apparatus 10. The ASIC_E 150 controls the reading control device 170 and the writing control device 180. In the present embodiment, as an example of an engine controlling device, the ASIC_E 150 includes functions or functional units of the engine controlling device. The operation panel 190 includes a panel display 190a and a key input device 190b. The panel display 190a is implemented by a touch panel, for example, to display the current setting values and a selection screen and receive an input from an operator (i.e., user). The key input device 190b includes keys such as numeric keys for receiving the setting values of various conditions related to image formation such as a density setting condition and a start key for receiving a copy start instruction. Each of the reading control device 170 and the writing control device 180 includes hardware components related to image processing such as error diffusion and gamma conversion. The reading control device 170 includes, for example, an analog-to-digital (A/D) converter that converts analog data into digital data. The writing control device 180 controls the entire image forming apparatus 10 to control rendering, communication, and input via the operation panel 190, for example.

With an application switch key included in the operation panel 190, the function of the image forming apparatus 10 is sequentially switched to a document box function, a copier function, a printer function, a facsimile (FAX) function, and an electronic mail forwarding function, for example, to select a desired function. When the document box function is selected, the image forming apparatus 10 is switched to a document box mode. When the copier function is selected, the image forming apparatus 10 is switched to a copy mode. When the printer function is selected, the image forming apparatus 10 is switched to a printer mode. When the FAX function is selected, the image forming apparatus 10 is switched to a FAX mode. When the electronic mail forwarding function is selected, the image forming apparatus 10 is switched to an electronic mail mode.

The network I/F 131 of the communication control device 130 is an interface for performing data communication via a communication network. The network I/F 131 and the near field communication circuit 132 are electrically connected to the ASIC_C 115 and the ASIC_E 150 via the PCI bus 120.

A description will be given of a hardware configuration of the ASIC_E 150 as an example of the engine controlling device.

Figure 3:
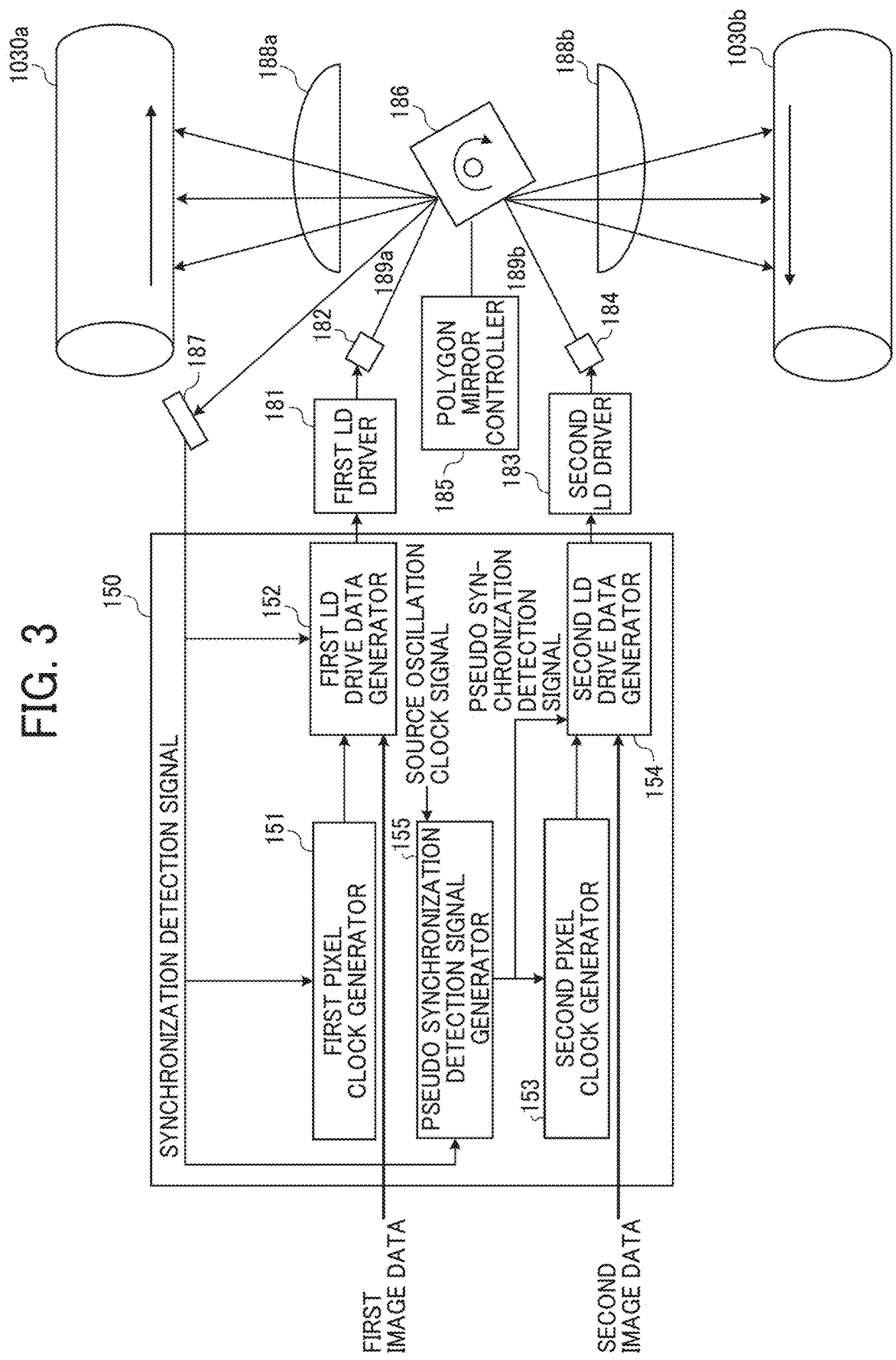
FIG. 3 is a diagram illustrating an example of the overall schematic configuration of an engine control device and a writing control device included in the color image forming apparatus of the first embodiment.

FIG. 3 is a diagram illustrating an example of the overall schematic configuration of the ASIC_E 150 (i.e., the engine controlling device) and the writing control device 180 of the first embodiment.

As illustrated in FIG. 3, the image forming apparatus 10 includes the ASIC_E 150, laser diode (LD) light sources 182 and 184, a first LD driver 181, a second LD driver 183, the photoconductor drums 1030a and 1030b, a polygon mirror 186, a polygon mirror controller 185 that controls the rotation of the polygon mirror 186, a photodiode (PD) 187 implemented as a synchronization sensor, and scanning lenses 188a and 188b. In the present embodiment, the polygon mirror 186 is an example of a rotary polygon mirror, and the PD 187 is an example of a synchronization detection signal generation circuit.

Emitted light 189a from the LD light source 182 is incident on the polygon mirror 186, which is controlled by the polygon mirror controller 185 to rotate at a predetermined rotation rate. The emitted light 189a is then reflected by deflecting and reflecting surfaces of the polygon mirror 186. With the rotation of the polygon mirror 186, the emitted light 189a periodically passes through the scanning lens 188a to scan the surface of the photoconductor drum 1030a at an angle adjusted in accordance with the width of the photoconductor drum 1030a. Emitted light 189b from the LD light source 184 is similarly incident on the polygon mirror 186 and reflected by the deflecting and reflecting surfaces of the polygon mirror 186. With the rotation of the polygon mirror 186, the emitted light 189b periodically passes through the scanning lens 188b to scan the surface of the photoconductor drum 1030b at an angle adjusted in accordance with the width of the photoconductor drum 1030b.

Consequently, an electrostatic latent image according to the output from the LD light source 182 is formed on the photoconductor drum 1030a, and an electrostatic latent image according to the output from the LD light source 184 is formed on the photoconductor drum 1030b. In the present embodiment, the emitted light 189a is an example of a first optical signal, and the emitted light 189b is an example of a second optical signal.

In the present embodiment, the term "output" refers to that, in response to receipt of certain input, a component such as a hardware component performs a particular circuit operation or process, for example, and transmits the result of the operation or process to the outside of the component as energy, signal, or information (i.e., data). This concept also applies to the subsequent embodiment described later.

The PD 187 is disposed at or near one end of the photoconductor drum 1030a. The emitted light 189a reflected by the polygon mirror 186 is incident on the PD 187 before being applied to the photoconductor drum 1030a to scan a line on the surface of the photoconductor drum 1030a, and the PD 187 detects a scanning start time (i.e., a first scanning start time). The scanning start time detected by the PD 187 is input to a first pixel clock generator 151, a first LD drive data generator 152, and a pseudo synchronization detection signal generator 155 of the ASIC_E 150 as a periodic synchronization detection signal timed with the scanning of the photoconductor drum 1030a. Further, first image data is input to an input terminal of the ASIC_E 150 to be transmitted to the first LD drive data generator 152, and second image data is input to an input terminal of the ASIC_E 150 to be transmitted to a second LD drive data generator 154. As well as the above-described generators 151, 152, and 154, and 155, the ASIC_E 150 further includes a second pixel clock generator 153.

As described above, in the present embodiment, there is no synchronization sensor for the photoconductor drum 1030b, and thus the synchronization detection signal for the photoconductor drum 1030b is not obtained. As a method of knowing a write start time to start writing on the photoconductor drum 1030b (i.e., a second scanning start time), therefore, the present embodiment provides a configuration and method for generating a pseudo synchronization detection signal synchronized with the signal output from the PD 187. In the present embodiment, as an example of a pseudo synchronization detection signal generation circuit, the pseudo synchronization detection signal generator 155 includes functions or functional units of the pseudo synchronization detection signal generation circuit.

A description will be given of the relationship between the deflecting and reflecting surfaces of the polygon mirror 186 and each of the emitted light 189a from the LD light source 182 for scanning the photoconductor drum 1030a and the emitted light 189b from the LD light source 184 for scanning the photoconductor drum 1030b.

Figure 4:
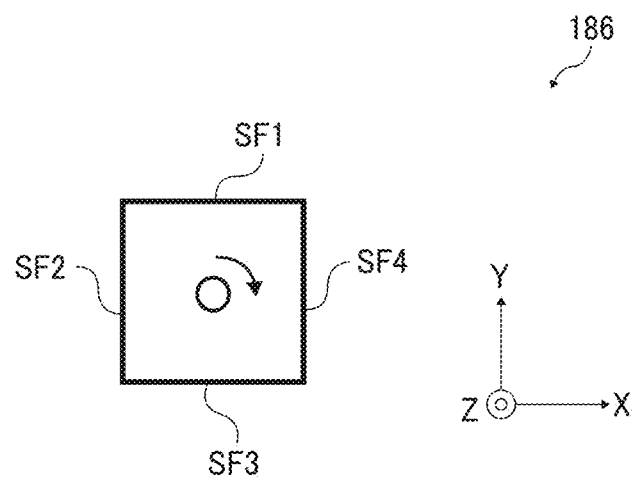
FIG. 4 is a diagram illustrating an example of four deflecting and reflecting surfaces of a rotary polygon mirror included in the color image forming apparatus of the first embodiment.

FIG. 4 is a diagram illustrating an example of four deflecting and reflecting surfaces of the polygon mirror 186 (i.e., the rotary polygon mirror). As illustrated in FIG. 4, the four deflecting and reflecting surfaces of the polygon mirror 186 will hereinafter be referred to as the first surface SF1, the second surface SF2, the third surface SF3, and the fourth surface SF4 counterclockwise in FIG. 4. The arrow in FIG. 4 indicates the rotation direction of the polygon mirror 186. As described above, the polygon mirror 186 as an example of the rotary polygon mirror is provided to deflect the first optical signal based on the first image data and the second optical signal based on the second image data.

For example, if the surface of the photoconductor drum 1030a is scanned with the light reflected by the first surface SF1, the surface of the photoconductor drum 1030b is scanned with the light reflected by the second surface SF2. Then, the surface of the photoconductor drum 1030a is scanned with the light reflected by the third surface SF3, and the surface of the photoconductor drum 1030b is scanned with the light reflected by the fourth surface SF4.

In the present embodiment, the polygon mirror 186 is not necessarily required to have four deflecting and reflecting surfaces. The number of deflecting and reflecting surfaces of the polygon mirror 186 may be six or another number. The deflecting and reflecting surfaces of the polygon mirror 186 will hereinafter be simply referred to as the surfaces of the polygon mirror 186.

Figure 5:
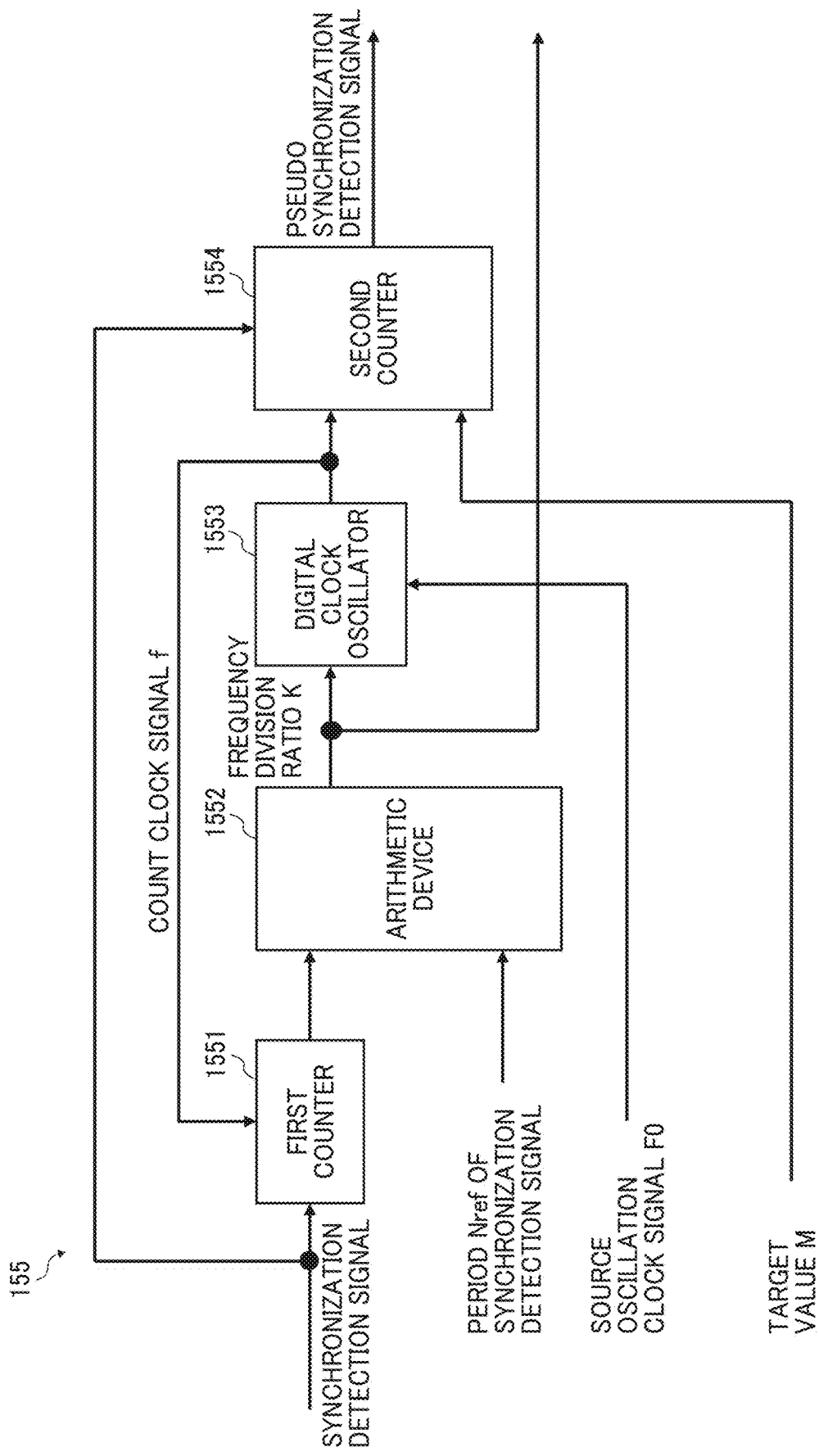
FIG. 5 is a diagram illustrating an example of the hardware configuration of a pseudo synchronization detection signal generator included in the color image forming apparatus of the first embodiment.

FIG. 5 is a diagram illustrating an example of the hardware configuration of the pseudo synchronization detection signal generator 155 of the first embodiment. As illustrated in FIG. 5, the pseudo synchronization detection signal generator 155 includes hardware components including a first counter 1551, an arithmetic device 1552, a digital clock oscillator 1553, and a second counter 1554. In the present embodiment, the arithmetic device 1552 is an example of an arithmetic circuit, and the digital clock oscillator 1553 is an example of a clock oscillator. In the first embodiment, the pseudo synchronization detection signal generator 155 generates a particular value N/Nref for generating the pseudo synchronization detection signal based on the previously calculated period Nref of the synchronization detection signal and a period N of the synchronization detection signal counted on a particular surface of the polygon mirror 186. Then, based on the generated particular value N/Nref, the pseudo synchronization detection signal generator 155 starts generating the pseudo synchronization detection signal at the time at which the synchronization signal is enabled. Herein, the unit of the periods Nref and N is microseconds (μp), for example.

Herein, at the time of (i.e., in response to) receipt of the synchronization detection signal input from the PD 187, the first counter 1551 clears the count value thereof (e.g., sets the count value to zero) in synchronization with a count clock signal f. The first counter 1551 then outputs the last count value (e.g., N1) to the subsequent arithmetic device 1552 as the value representing the period of the synchronization detection signal.

Based on the last count value output from the first counter 1551 and the value of the period Nref (i.e., the ideal period) of the synchronization detection signal, the arithmetic device 1552 calculates a frequency division ratio K for dividing the frequency of a source oscillation clock signal F0, and outputs the calculated frequency division ratio K to the subsequent digital clock oscillator 1553.

The digital clock oscillator 1553 is implemented by a frequency divider. The digital clock oscillator 1553 divides the frequency of the source oscillation clock signal F0 oscillating at high frequency (e.g., a few gigahertz (Ghz)) by the frequency division ratio K calculated by the arithmetic device 1552, to thereby generate the count clock signal f that oscillates at a desired frequency. The digital clock oscillator 1553 then outputs the generated count clock signal f to the first counter 1551 and the subsequent second counter 1554.

The second counter 1554 is also called a pseudo synchronization counter. The second counter 1554 receives inputs of the count clock signal f oscillated by the digital clock oscillator 1553, a target value M supplied by register setting, for example, and the synchronization detection signal. The second counter 1554 then generates the pseudo synchronization detection signal based on these inputs, and outputs the generated pseudo synchronization detection signal. In synchronization with the output of the pseudo synchronization detection signal, the second counter 1554 clears the count value thereof (e.g., sets the count value to zero). The above-described processes form a basic operation of the pseudo synchronization detection signal generator 155.

A method of controlling the time of generating the pseudo synchronization detection signal by controlling the frequency division ratio K will be described below with reference to the time of generating the pseudo synchronization detection signal illustrated in FIG. 6.

Figure 6:
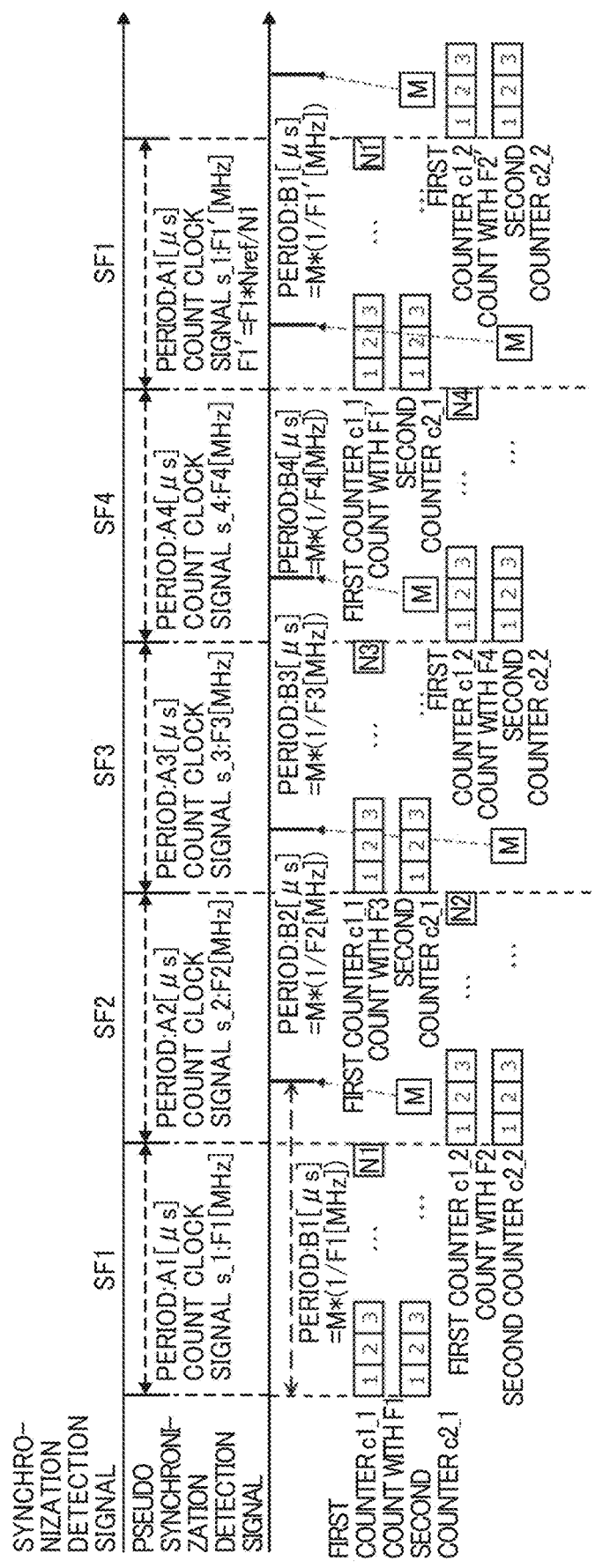
FIG. 6 is a timing chart illustrating an example of the time of generating a pseudo synchronization detection signal in the first embodiment.

FIG. 6 illustrates an example using a pseudo synchronization detection signal generator g_1 and a pseudo synchronization detection signal generator g_2, each of which has a similar configuration to that of the pseudo synchronization detection signal generator 155 illustrated in FIG. 5. The pseudo synchronization detection signal generator g_1 includes a first counter c1_1 (corresponding to the first counter 1551) and a second counter c2_1 (corresponding to the second counter 1554). The pseudo synchronization detection signal generator g_2 includes a first counter c1_2 (corresponding to the first counter 1551) and a second counter c2_2 (corresponding to the second counter 1554).

The target value M represents the position for generating the pseudo synchronization detection signal when the synchronization detection signal has the ideal period (i.e., when the count value of the first counter 1551 is Nref). The value of the period Nref and the target value M are previously calculated based on the configuration of the optical system. In this case, a time Tref from the synchronization detection signal to the pseudo synchronization detection signal is calculated from equation (2) given below.

$$Tref = 1/f * M \quad (2)$$

If the ideal period Nref of the synchronization detection signal is changed to the period N owing to uneven rotation of the polygon mirror 186 or variation in accuracy between the surfaces of the polygon mirror 186, a time T from the ideal synchronization detection signal to the pseudo synchronization detection signal is calculated from equation (3) given below.

$$T = 1/f * M * N/Nref \quad (3)$$

This is based on changing the current frequency f of the clock signal f to a new frequency f', as in equation (4) given below.

$$f' = f * Nref/N \quad (4)$$

Therefore, the frequency division ratio K is changed. With the frequency F0 of the source oscillation clock signal F0 and the current frequency division ratio K, a new frequency division ratio K' is calculated from equation (5) given below.

$$K' = K * N/Nref \quad (5)$$

As observed in equation (5), based on the particular value N/Nref and the frequency division ratio K previously calculated to divide the frequency F0 of the source oscillation clock signal F0 supplied to the digital clock oscillator 1553, the arithmetic device 1552 calculates the new frequency division ratio K' for dividing the frequency f of the count clock signal f.

The arithmetic device 1552 calculates the new frequency division ratio K', as described above, and the calculated new frequency division ratio K' is set in the digital clock oscillator 1553. Immediately after the update to the new frequency division ratio K', the digital clock oscillator 1553 is able to output the count clock signal f that oscillates at the desired frequency.

At the time of (i.e., in response to) receipt of the synchronization detection signal, the second counter 1554 starts counting up with the count clock signal f. Then, when the count value of the second counter 1554 reaches the target value M for generating the pseudo synchronization detection signal, the second counter 1554 generates the pseudo synchronization detection signal. That is, at the time of (i.e., in response to) enabling of the synchronization detection signal, the second counter 1554 starts generating the pseudo synchronization detection signal such that the pseudo synchronization detection signal is generated after a particular surface of the polygon mirror 186 makes one revolution. Herein, the time of receipt of the synchronization detection signal includes a time synchronizing with the enabling of the synchronization detection signal.

The time of generating the pseudo synchronization detection signal according to the method described above with equations (2) to (5) will be described with FIG. 6.

FIG. 6 is a timing chart illustrating an example of the time of generating the pseudo synchronization detection signal in the first embodiment. As illustrated in FIG. 6, the engine control device 140 including the polygon mirror 186 with the four surfaces SF1 to SF4 (see FIG. 4) first executes the following timing control on the first surface SF1 of the polygon mirror 186. As described above with FIG. 5, the synchronization detection signal is input to the first counter 1551, and the count value counted with a count clock signal s_1 oscillating at a frequency F1 megahertz [Mhz] is cleared at the count value N1 with the next input of the synchronization detection signal. In the second counter 1554, on the other hand, when the count value counted with the count clock signal s_1 oscillating at the frequency F1 [Mhz] reaches the preset target value M, the pseudo synchronization detection signal is generated and the count value (i.e., the target value M) is cleared. That is, at the time at which the synchronization detection signal is enabled (i.e., in synchronization with the time at which the synchronization detection signal is enabled), the second counter 1554 starts generating the pseudo synchronization detection signal to generate the pseudo synchronization detection signal in the period in which the synchronization detection signal is enabled next time.

In the above-described example of the present embodiment, the time of generating the pseudo synchronization detection signal is based on the relationship N<M. In this case, the period of the synchronization detection signal on the first surface SF1 of the polygon mirror 186 is A1 [µp], and the period of the pseudo synchronization detection signal on the first surface SF1 of the polygon mirror 186 is M*(1/F1 [Mhz])=B1 [µp].

As for the second surface SF2 of the polygon mirror 186, the synchronization detection signal is input to the first counter 1551, and the count value counted with a count clock signal s_2 oscillating at a frequency F2 [Mhz] is cleared at a count value N2 with the next input of the synchronization detection signal. In the second counter 1554, on the other hand, when the count value counted with the count clock signal s_2 oscillating at the frequency F2 [Mhz] reaches the preset target value M, the pseudo synchronization detection signal is generated, and the count value (i.e., the target value M) is cleared. In this case, the period of the synchronization detection signal on the second surface SF2 of the polygon mirror 186 is A2 [µp], and the period of the pseudo synchronization detection signal on the second surface SF2 of the polygon mirror 186 is M*(1/F2 [Mhz])=B2 [µp].

As for the third surface SF3 of the polygon mirror 186, the synchronization detection signal is input to the first counter 1551, and the count value counted with a count clock signal s_3 oscillating at a frequency F3 [Mhz] is cleared at a count value N3 with the next input of the synchronization detection signal. In the second counter 1554, on the other hand, when the count value counted with the count clock signal s_3 oscillating at the frequency F3 [Mhz] reaches the preset target value M, the pseudo synchronization detection signal is generated, and the count value (i.e., the target value M) is cleared. In this case, the period of the synchronization detection signal on the third surface SF3 of the polygon mirror 186 is A3 [µp], and the period of the pseudo synchronization detection signal on the third surface SF3 of the polygon mirror 186 is M*(1/F3 [Mhz])=B3 [µp].

As for the fourth surface SF4 of the polygon mirror 186, the synchronization detection signal is input to the first counter 1551, and the count value counted with a count clock signal s_4 oscillating at a frequency F4 [Mhz] is cleared at a count value N4 with the next input of the synchronization detection signal. In the second counter 1554, on the other hand, when the count value counted with the count clock signal s_4 oscillating at the frequency F4 [Mhz] reaches the preset target value M, the pseudo synchronization detection signal is generated, and the count value (i.e., the target value M) is cleared. In this case, the period of the synchronization detection signal on the fourth surface SF4 of the polygon mirror 186 is A4 [µp], and the period of the pseudo synchronization detection signal on the fourth surface SF4 of the polygon mirror 186 is M*(1/F4 [Mhz])=B4 [µp]. The respective frequency division ratios K for the above-described frequencies F1, F2, F3, and F4 (i.e., frequency division ratios K1, K2, K3, and K4) may be held in a particular storage device included in the ASIC_E 150 or the writing control device 180, for example, and each of the frequency division ratios K may be rewritten with a new value each time the counting result is reflected in the generation of the pseudo synchronization detection signal.

After the polygon mirror 186 makes one revolution (i.e., one rotation), counter control similar to that performed for the first surface SF1 of the polygon mirror 186 before the one revolution is performed for the post-revolution first surface SF1 by the same hardware components as those used in the pre-revolution counter control. The pseudo synchronization detection signal generated on the pre-revolution first surface SF1 of the polygon mirror 186 is generated based on the count value counted with the count clock signal s_1 oscillating at a frequency F1' (F1) [Mhz] when the first surface SF1 of the polygon mirror 186 has made the one revolution. That is, the new pseudo synchronization detection signal for the first surface SF1 of the polygon mirror 186 is applied after the one revolution of the polygon mirror 186. This is because, in consideration of fluctuations in the period of the synchronization detection signal due to the accuracy variation between the surfaces of the polygon mirror 186, it is desirable to apply the pseudo synchronization detection signal to the same surface of the polygon mirror 186 after the one revolution of the polygon mirror 186. In consideration of the influence of the surface accuracy of the polygon mirror 186, the earliest possible time for applying the pseudo synchronization detection signal is after the one revolution of the polygon mirror 186.

In the example of FIG. 6, the two counters are toggle-controlled such that the counting on the first surface SF1 and the third surface SF3 of the polygon mirror 186 is performed with the first counter c1_1 and the second counter c2_1, and that the counting on the second surface SF2 and the fourth surface SF4 of the polygon mirror 186 is performed with the first counter c1_2 and the second counter c2_2. Therefore, the respective frequency division ratios K, i.e., the frequency division ratios K1 to K4 and K1' to K4' for the frequencies F1 to F4 and F1' to F4', are held in a memory in the toggle control. For example, therefore, the ASIC_E 150 may store the respective frequency division ratios K (i.e., K1 to K4 and K1' to K4') output from the arithmetic device 1552 of the pseudo synchronization detection signal generator 155 in a particular storage area (i.e., a frequency division ratio storage area) included in the ASIC_E 150. Then, when performing the toggle control of the two counters, the ASIC_E 150 may read the corresponding one of the frequency division ratios K1 to K4 and K1' to K4'. In the present embodiment, the frequency division ratio storage area may be implemented by a memory such as an electrically erasable programmable ROM (EEPROM), for example. As an example of a frequency division ratio storage device, the frequency division ratio storage area includes functions or functional units of the frequency division ratio storage device.

Figure 7:
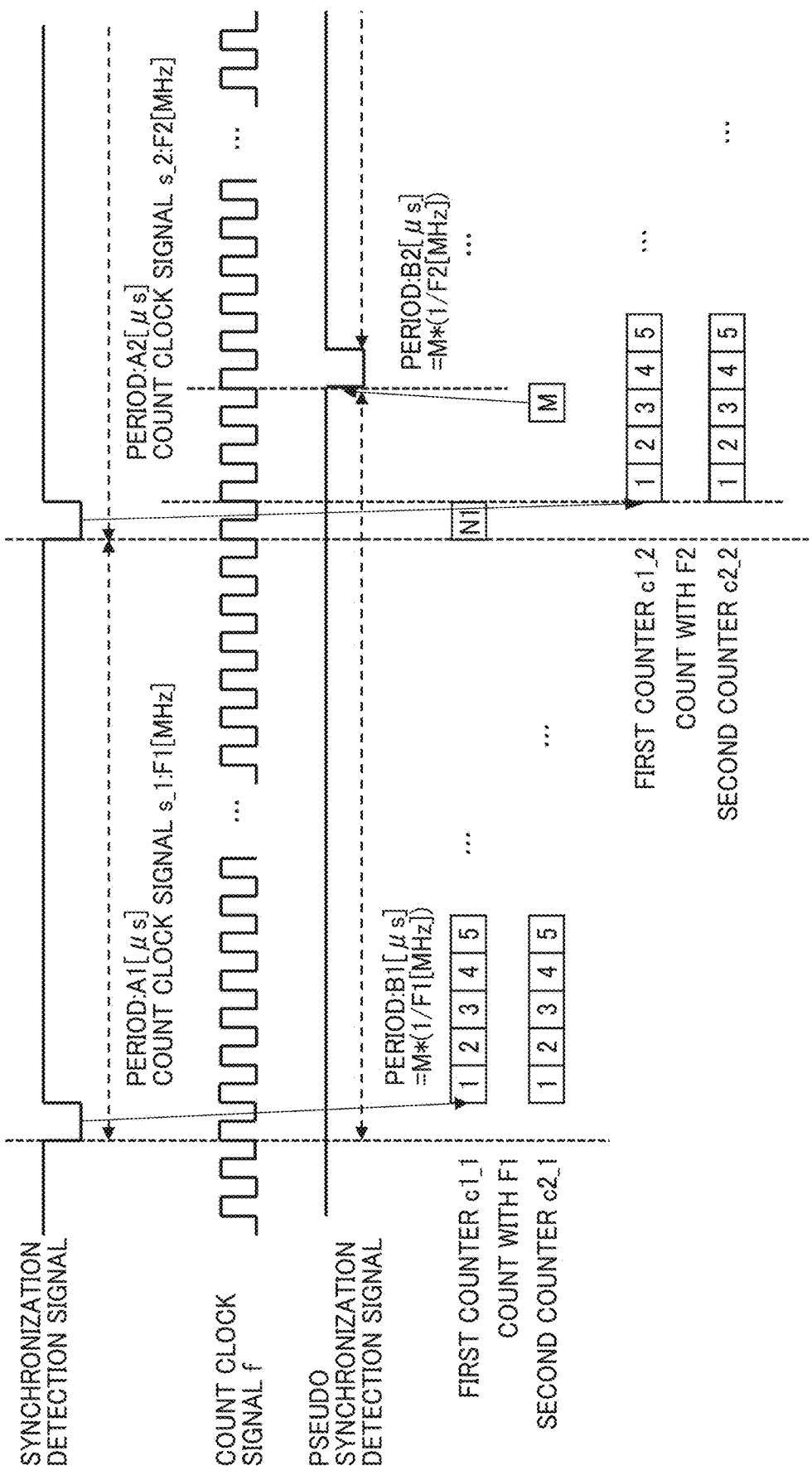
FIG. 7 is an enlarged view of a part of the timing chart in FIG. 6 illustrating an example of the time of generating the pseudo synchronization detection signal in the first embodiment.

FIG. 7 is an enlarged view of a part of the timing chart in FIG. 6 illustrating an example of the time of generating the pseudo synchronization detection signal in the first embodiment. FIG. 7 visually illustrates the behavior of the count clock signal f on the first surface SF1 of the polygon mirror 186. The deviation of the synchronization detection signal, i.e., the deviation of the count value N at which the first counter 1551 is cleared, may amount to one to a few periods of the count clock signal f.

Since a rotary polygon mirror has a manufacturing error, different deflecting and reflecting surfaces of the rotary polygon mirror may result in different write start positions owing to the accuracy variation between the deflecting and reflecting surfaces. According to the above-described method, therefore, when the synchronization detection signal is detected on a particular surface of the polygon mirror 186, the pseudo synchronization detection signal generator 155 outputs the pseudo synchronization detection signal on the same particular surface of the polygon mirror 186 after the polygon mirror 186 makes one revolution. Thereby, the influence of the errors in the surfaces of the polygon mirror 186 is avoided. Further, the first counter 1551 and the second counter 1554 sequentially perform counting with two pseudo pixel clock signals, and the pseudo synchronization detection signals for the respective surfaces of the polygon mirror 186 are sequentially output. As described above, the earliest possible time for applying the pseudo synchronization detection signal is after one revolution of the polygon mirror 186.

As described above, the result of the arithmetic operation in the arithmetic device 1552 is uniquely determined. If a typical digital circuit is used to obtain the arithmetic operation result, the obtained arithmetic operation result is settable in the digital clock oscillator 1553 with a process lasting for one period of the count clock signal f.

As described above, according to the first embodiment, the pseudo synchronization detection signal generator 155 generates the particular value N/Nref based on the previously calculated period Nref of the synchronization detection signal and the period N of the synchronization detection signal counted on a particular surface of the polygon mirror 186. Based on the generated particular value N/Nref, the pseudo synchronization detection signal generator 155 calculates the frequency division ratio K' for dividing the frequency f of the count clock signal f. Then, at the time at which the synchronization detection signal is enabled, the pseudo synchronization detection signal generator 155 starts generating the pseudo synchronization detection signal with the calculated frequency division ratio K' and the target value M for generating the pseudo synchronization detection signal. The present embodiment therefore does not involve the clock control and the generation of the pseudo synchronization detection signal using the feedback control system. Thereby, the measurement result obtained by the first counter 1551 is promptly reflected in the generation of the pseudo synchronization detection signal, improving the responsiveness in the generation of the pseudo synchronization detection signal. Consequently, undesirable deviation of the image write start position in the main scanning direction is avoided, providing a high-quality image.

A modified example of the first embodiment will be described.

Figure 8:
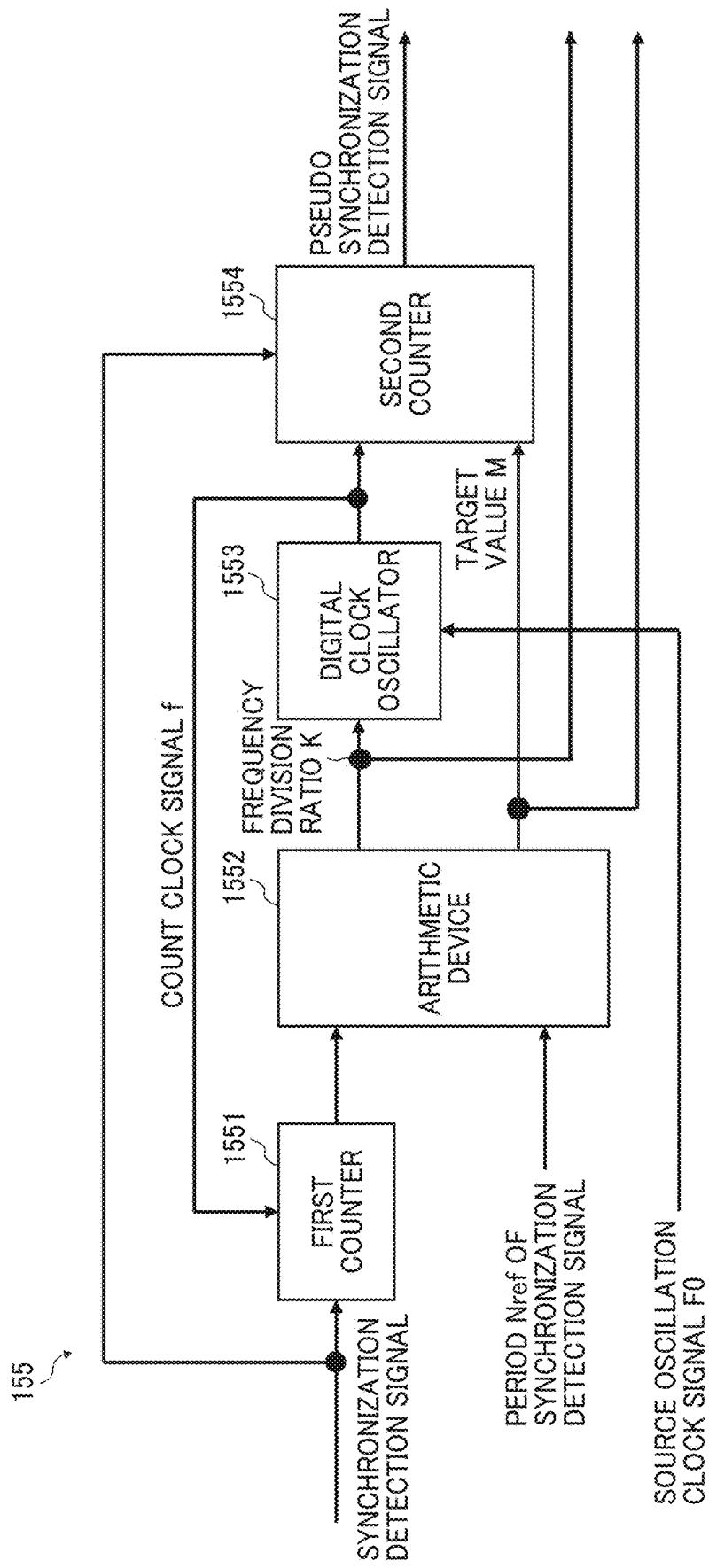
FIG. 8 is a diagram illustrating an example of the hardware configuration of the pseudo synchronization detection signal generator according to a modified example of the first embodiment.

As another method for implementing equation (3) described above, the target value M for generating the pseudo synchronization detection signal may be changed. FIG. 8 is a diagram illustrating an example of the hardware configuration of the pseudo synchronization detection signal generator 155 according to a modified example of the first embodiment. As illustrated in FIG. 8, the components of the pseudo synchronization detection signal generator 155 in the modified example are similar in configuration to those illustrated in FIG. 5. The target value M input to the second counter 1554 is, however, output from the arithmetic device 1552, instead of being supplied by register setting, for example. That is, the pseudo synchronization detection signal generator 155 is modified to output the target value M from the arithmetic device 1552, instead of supplying the target value M by register setting, for example. Specifically, the arithmetic device 1552 may calculate (i.e., compute) a new target value M', as in equation (6) given below.

$$M'=M*N/Nref \quad (6)$$

With equation (6), the arithmetic device 1552 calculates the target value M' for generating the pseudo synchronization detection signal based on the particular value N/Nref and the target value M previously calculated to generate the pseudo synchronization detection signal and counted by the second counter 1554. The arithmetic device 1552 outputs the target value M' obtained through the calculation of equation (6) to the second counter 1554. Thereby, the second counter 1554 is able to generate the pseudo synchronization detection signal when the count value counted up with the count clock signal f reaches the desired target value M'. In this case, too, no feedback control system is used, and thus the responsiveness of the control system is improved. The modified example is therefore capable of avoiding the undesirable deviation of the image write start position in the main scanning direction, which is related to the responsiveness in the generation of the pseudo synchronization detection signal, and thus providing a high-quality image.

Figure 9:
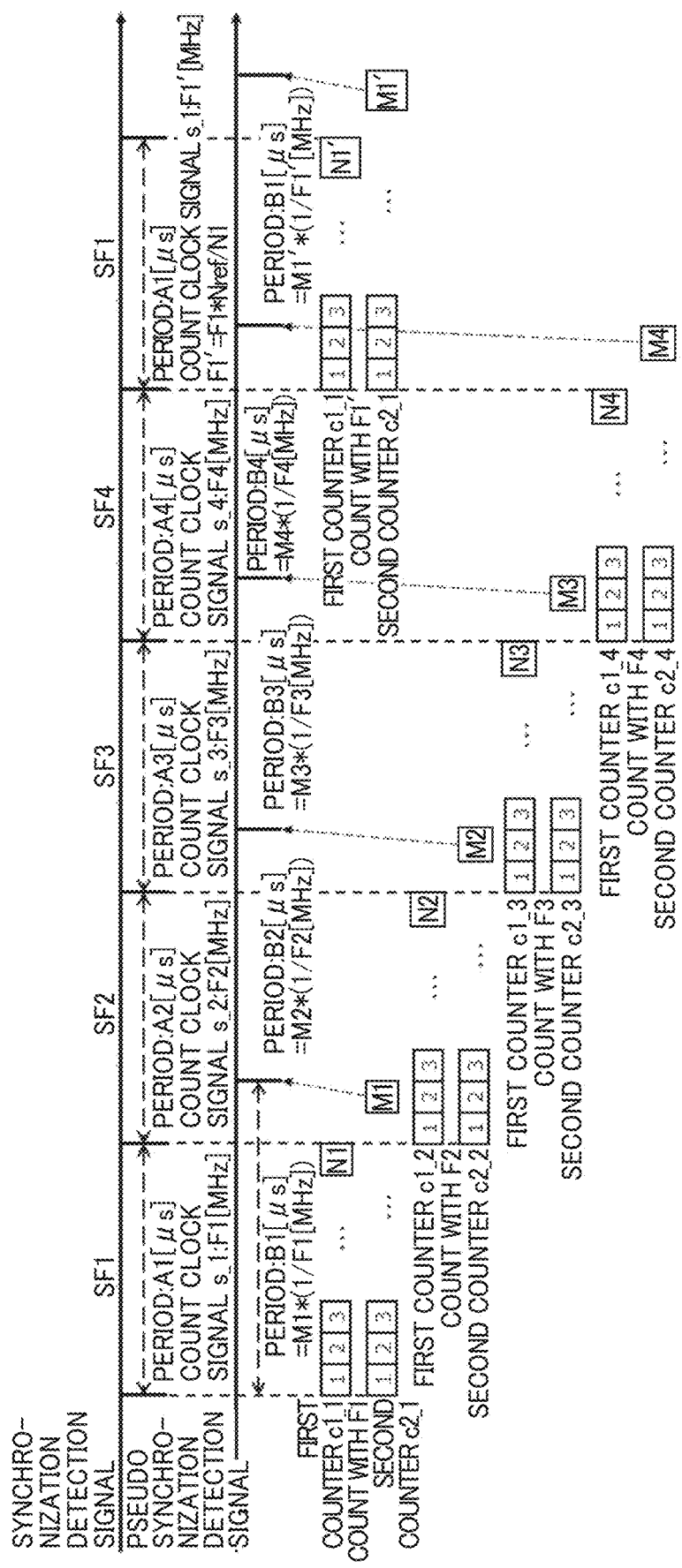
FIG. 9 is a timing chart illustrating an example of the time of generating the pseudo synchronization detection signal in the modified example of the first embodiment.

FIG. 9 is a timing chart illustrating an example of the time of generating the pseudo synchronization detection signal in the modified example of the first embodiment. As illustrated in FIG. 9, the time of generating the pseudo synchronization detection signal in the modified example is basically similar to that described above with FIG. 6. FIG. 9 illustrates an example using a pseudo synchronization detection signal generator g_1, a pseudo synchronization detection signal generator g_2, a pseudo synchronization detection signal generator g_3, and a pseudo synchronization detection signal generator g_4, each of which has a similar configuration to that of the pseudo synchronization detection signal generator 155.

A difference from the example in FIG. 6 is that the target value M for generating the pseudo synchronization detection signal is changed in accordance with the surface accuracy of each of the surfaces of the polygon mirror 186, for example. Specifically, the pseudo synchronization detection signal is generated for each of the first to fourth surfaces SF1 to SF4 of the polygon mirror 186 with the target value M set to M1, M2, M3, and M4 for the first surface SF1, the second surface SF2, the third surface SF3, and the fourth surface SF4 of the polygon mirror 186, respectively. Further, the example in FIG. 9 is different from the example in FIG. 6 in that counters are provided for each of the first to fourth surfaces SF1 to SF4 of the polygon mirror 186, while the example in FIG. 6 involves the toggle control of the two counters, i.e., the first counter c1_1 and the second counter c2_1 or the first counter c1_2 and the second counter c2_2. In the example of FIG. 9, however, the pseudo synchronization detection signal may be generated with toggle control of two counters similarly as in the example of FIG. 6. Similarly as in the case of the frequency division ratio K, the ASIC_E 150 may store the respective target values M (i.e., M1, M2, M3, and M4 and M1', M2', M3', and M4') output from the arithmetic device 1552 of the pseudo synchronization detection signal generator 155 in a particular storage area (i.e., a target value storage area) included in the ASIC_E 150. Then, when performing the toggle control of the two counters, the ASIC_E 150 may read the corresponding one of the target values M1 to M4 and M1' to M4'. In this case, the target value storage area may be implemented by a memory such as an EEPROM, for example. As an example of a target value storage device, the target value storage area includes functions or functional units of the target value storage device.

Figure 10:
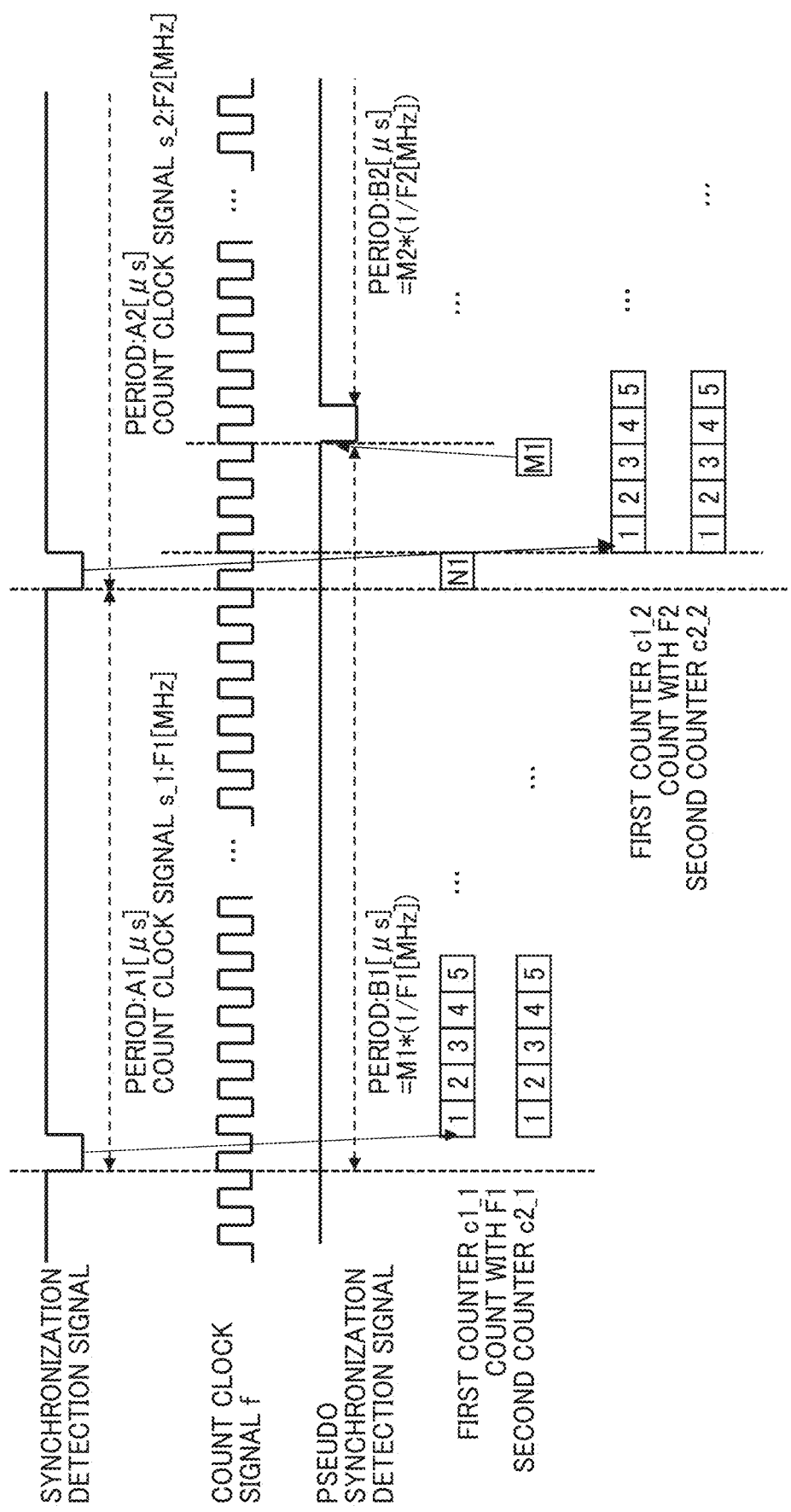
FIG. 10 is an enlarged view of a part of the timing chart in FIG. 9 illustrating an example of the time of generating the pseudo synchronization detection signal in the modified example of the first embodiment.

FIG. 10 is an enlarged view of a part of the timing chart in FIG. 9 illustrating an example of the time of generating the pseudo synchronization detection signal in the modified example of the first embodiment. Similarly to FIG. 7, FIG. 10 illustrates an enlarged view of a part of the preceding figure illustrating the time of generating the pseudo synchronization detection signal on the first surface SF1 of the polygon mirror 186; FIG. 10 is similar in content to FIG. 9. Therefore, detailed description of FIG. 10 will be omitted here.

As described above, according to the modified example of the first embodiment, the pseudo synchronization detection signal generator 155 generates the particular value N/Nref based on the previously calculated period Nref of the synchronization detection signal and the period N of the synchronization detection signal counted on a particular surface of the polygon mirror 186. Based on the generated particular value N/Nref, the pseudo synchronization detection signal generator 155 then calculates the target value M' for generating the pseudo synchronization detection signal. Then, at the time at which the synchronization detection signal is enabled, the pseudo synchronization detection signal generator 155 starts generating the pseudo synchronization detection signal based on the frequency division ratio K for generating the count clock signal f and the calculated target value M'. Similarly to the first embodiment, the modified example does not involve the clock control and the generation of the pseudo synchronization detection signal using the feedback control system. Consequently, the measurement result obtained by the first counter 1551 is promptly reflected in the generation of the pseudo synchronization detection signal, improving the responsiveness in the generation of the pseudo synchronization detection signal. Thereby, the undesirable deviation of the image write start position in the main scanning direction is avoided, providing a high-quality image.

A second embodiment of the present invention will be described.

Figure 11:
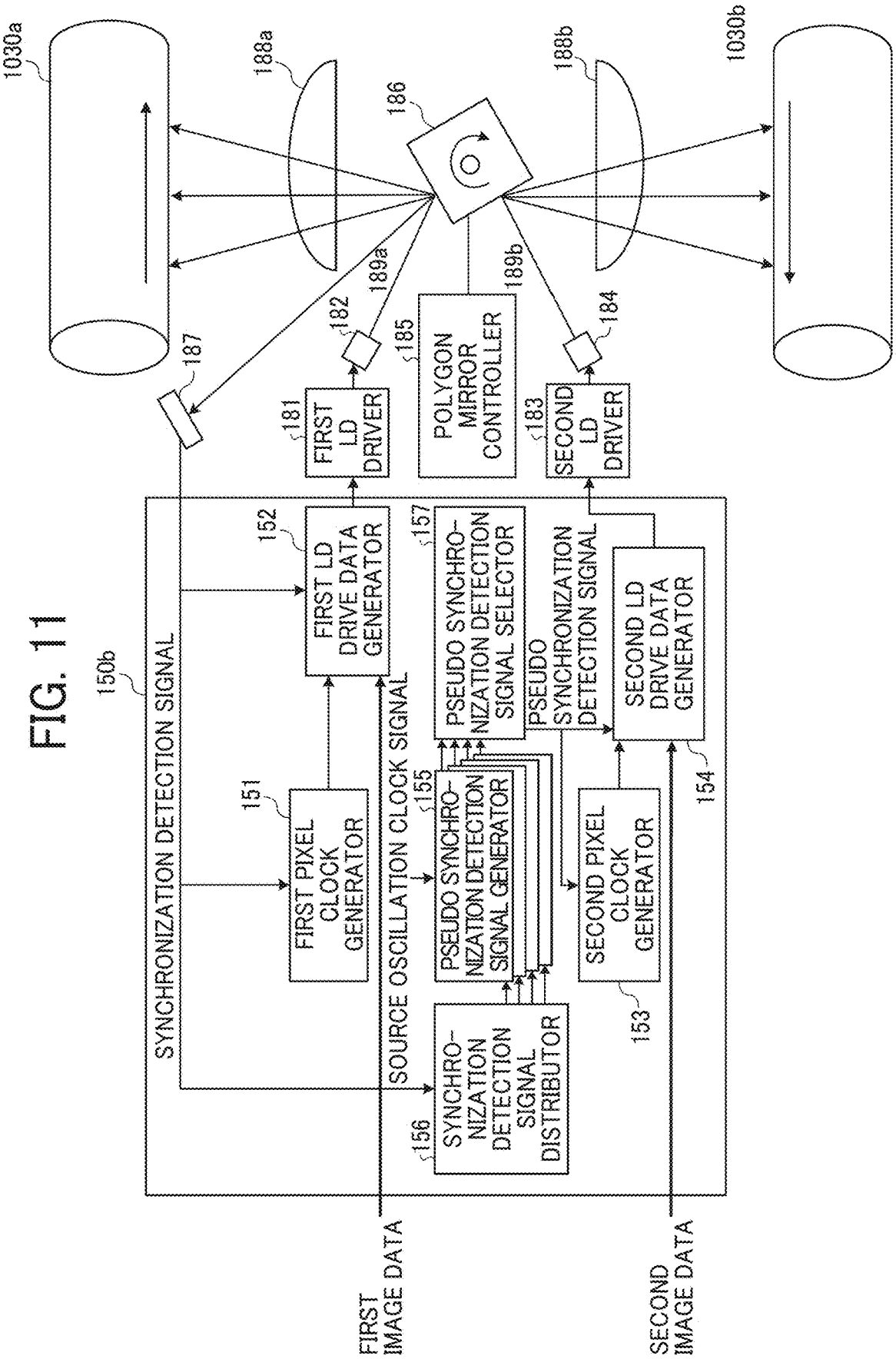
FIG. 11 is a diagram illustrating an example of the overall schematic configuration of an engine control device and the writing control device included in the color image forming apparatus according to a second embodiment of the present invention.

FIG. 11 is a diagram illustrating an example of the overall schematic configuration of an ASIC_E 150b (i.e., the engine controlling device) and the writing control device 180 of the second embodiment. As illustrated in FIG. 11, four pseudo synchronization detection signal generators 155 are provided for the four surfaces of the polygon mirror 186. That is, the ASIC_E 150b includes the pseudo synchronization detection signal generators 155 for the respective surfaces of the polygon mirror 186 for deflecting the first optical signal based on the first image data and the second optical signal based on the second image data. Accordingly, the ASIC_E 150b includes four sets of the hardware resources of the pseudo synchronization detection signal generator 155 illustrated in FIGS. 5 and 8.

As illustrated in FIG. 11, a synchronization detection signal distributor 156 supplies the synchronization detection signal to the respective pseudo synchronization detection signal generators 155 (e.g., pseudo synchronization detection signal generators 155-1, 155-2, 155-3, and 155-4) for the respective surfaces of the polygon mirror 186. That is, each of the pseudo synchronization detection signal generators 155 receives the input of the synchronization detection signal once every four surfaces.

With the above-described configuration, a pseudo synchronization detection signal selector 157 selects one of signals output from the four pseudo synchronization detection signal generators 155, and outputs the selected signal to the subsequent second LD drive data generator 154 as the pseudo synchronization detection signal. Each of the pseudo synchronization detection signal generators 155 outputs the signal once every four surfaces. The pseudo synchronization detection signal selector 157 may combine the four output signals from the pseudo synchronization detection signal generators 155 into one signal and output the thus-combined signal to the subsequent second LD drive data generator 154. In the second embodiment, each of the pseudo synchronization detection signal generators 155 thus generates the pseudo synchronization detection signal for the corresponding one of the surfaces of the polygon mirror 186.

Figure 12:
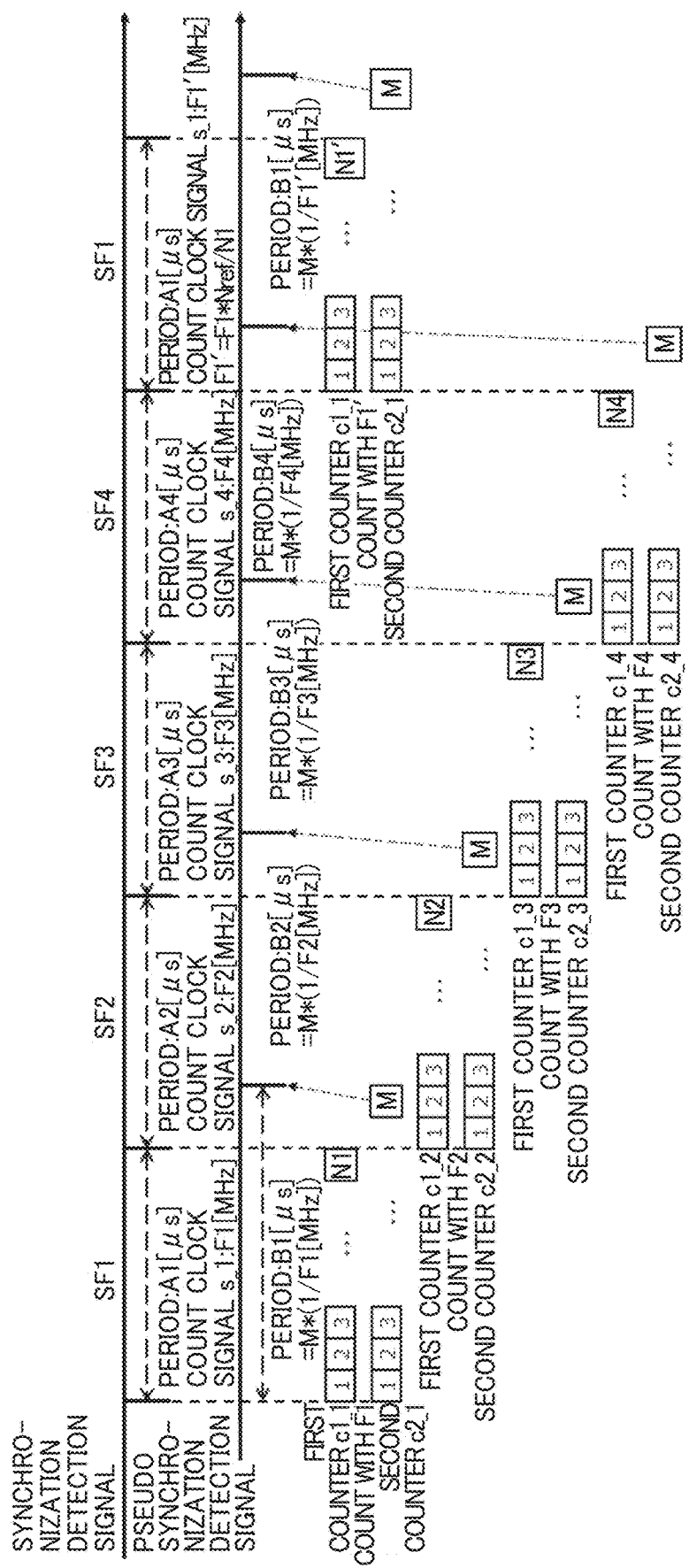
FIG. 12 is a timing chart illustrating an example of the time of generating the pseudo synchronization detection signal in the second embodiment.

FIG. 12 is a timing chart illustrating an example of the time of generating the pseudo synchronization detection signal in the second embodiment. The timing chart of FIG. 12 is similar to that of FIG. 9 in the configuration of the counters. In the timing chart of FIG. 12, however, the frequency division ratio K and the target value M for outputting the pseudo synchronization detection signal are changed in accordance with each of the surfaces of the polygon mirror 186. FIG. 12 illustrates an example using a pseudo synchronization detection signal generator g_1, a pseudo synchronization detection signal generator g_2, a pseudo synchronization detection signal generator g_3, and a pseudo synchronization detection signal generator g_4, each of which has a similar configuration to that of the pseudo synchronization detection signal generator 155.

Figure 13:
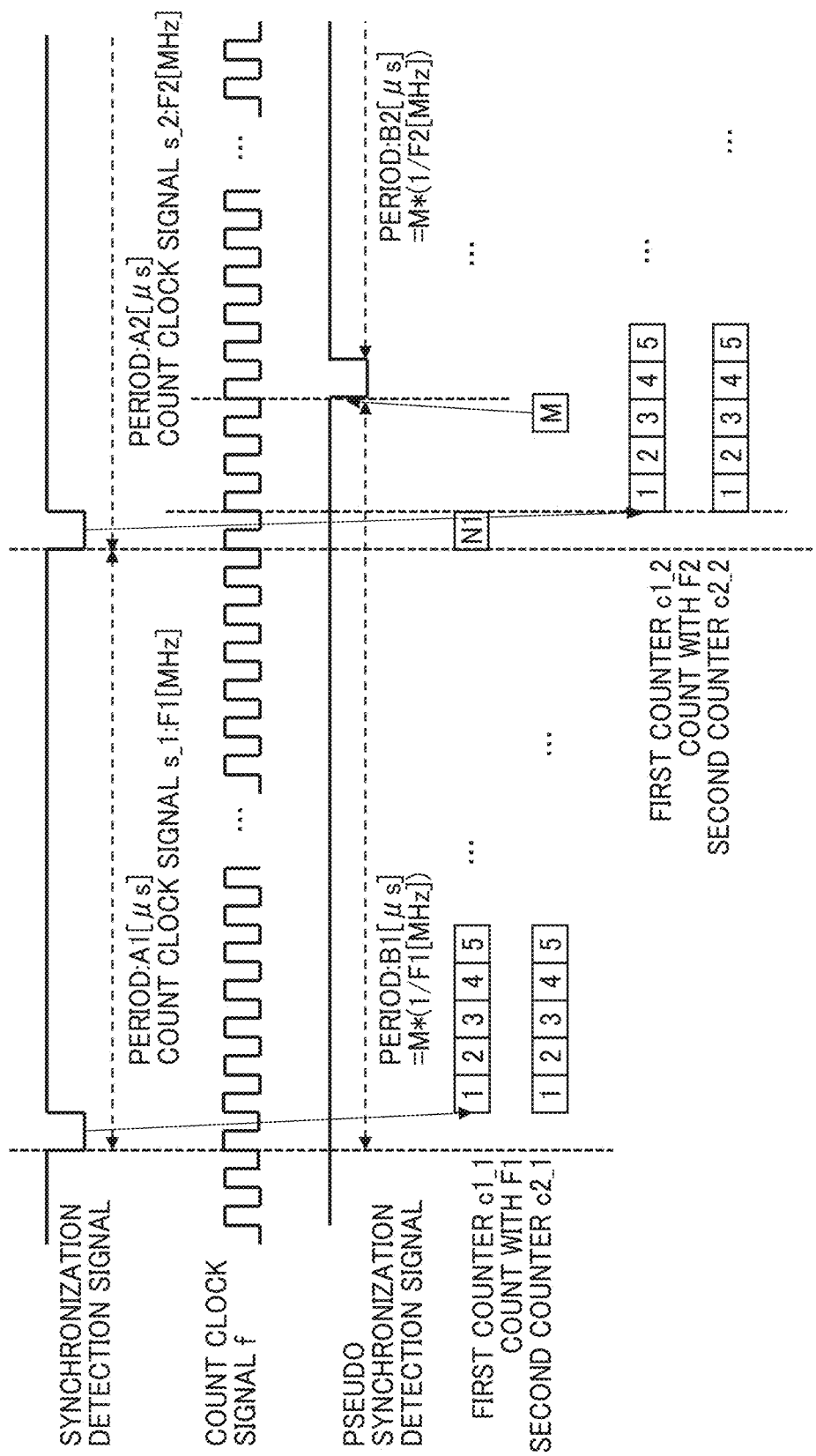
FIG. 13 is an enlarged view of a part of the timing chart in FIG. 12 illustrating an example of the time of generating the pseudo synchronization detection signal in the second embodiment.

FIG. 13 is an enlarged view of a part of the timing chart in FIG. 12 illustrating an example of the time of generating the pseudo synchronization detection signal in the second embodiment. Similarly to FIG. 7, FIG. 13 illustrates an enlarged view of a part of the preceding figure illustrating the time of generating the pseudo synchronization detection signal on the first surface SF1 of the polygon mirror 186; FIG. 13 is similar in content to FIG. 12. Therefore, detailed description of FIG. 13 will be omitted here.

As described above, according to the second embodiment, the first counter 1551 and the second counter 1554 (i.e., the pseudo synchronization counter) are provided for each of the surfaces of the polygon mirror 186, and the counters to be used are sequentially switched in accordance with each of the surfaces of the polygon mirror 186, as illustrated in FIG. 12. That is, the calculation according to a desired one of the method of the first embodiment to calculate the frequency division ratio K' and the method of the modified example of the first embodiment to calculate the target value M' is performed for each of the surfaces of the polygon mirror 186. More specifically, either one of the method of the first embodiment to calculate the frequency division ratio K' and the method of the modified example of the first embodiment to calculate the target value M' may be used for each of the surfaces of the polygon mirror 186. Thereby, the time of generating the pseudo synchronization detection signal is continuously corrected. Further, each of the pseudo synchronization detection signal generators 155 is capable of performing timing control according to the characteristics of the corresponding one of the surfaces of the polygon mirror 186. In the generation of the pseudo synchronization detection signal, therefore, timing design is expected to be simplified and improved in efficiency.

In the above-described embodiments, the ASIC_E 150 or 150b (an example of the engine controlling device) including the pseudo synchronization detection signal generator 155 is not necessarily included in the image forming apparatus. As an example of the engine controlling device, the ASIC_E 150 or 150b may be included and used in a counter optical scanning device or in an apparatus or equipment including such an optical scanning device, for example.

Further, the operation of the pseudo synchronization detection signal generator 155 illustrated in FIG. 5 or 8 may be implemented by software. That is, a particular program may be executed under the control of the CPU 111 or the ASIC_C 115 of the printer control device 110 or the ASIC_E 150 or 150b of the engine control device 140. For example, if the CPU 111 executes the calculations of equations (2) to (6) within one period of the synchronization detection signal to generate the above-described pseudo synchronization detection signal to be applied to the same surface of the polygon mirror 186, it is possible to omit the illustrative hardware configuration described above in each of the embodiments.

A program for executing the above-described method may be distributed as recorded on a computer readable recording medium in an installable or executable file format. Examples of such a recording medium include a CD-R, a DVD, a Blu-ray (registered trademark) disc, a secure digital (SD) card, and a USB memory. The recording medium may be shipped to the market as a program product. For example, a clock control method of the present invention is implemented by execution of a program of the present invention.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Circuitry includes a programmed processor to execute the above-described functions with software, such as a processor implemented by an electronic circuit, as a processor includes circuitry. A processing circuit also includes devices such as an application specific integrated circuit (ASIC), digital signal processor (DSP), field programmable gate array (FPGA), system on a chip (SOC), a graphics processing unit (GPU), and conventional circuit components arranged to perform the recited functions. Further, the above-described steps are not limited to the order disclosed herein.

The invention claimed is:

1. An image forming apparatus comprising:
a first scanned medium configured to be scanned with a first optical signal based on first image data;
a second scanned medium configured to be scanned with a second optical signal based on second image data;
a rotary polygon mirror configured to deflect the first optical signal and the second optical signal;
a synchronization detection signal generation circuit configured to generate a synchronization detection signal representing a first scanning start time to start scanning the first scanned medium; and
at least one pseudo synchronization detection signal generation circuit configured to generate a pseudo synchronization detection signal with the synchronization detection signal, the pseudo synchronization detection signal representing a second scanning start time to start scanning the second scanned medium,
the at least one pseudo synchronization detection signal generation circuit being configured to
based on a previously calculated period of the synchronization detection signal and a period of the synchronization detection signal counted on a particular surface of the rotary polygon mirror, generate a particular value for generating the pseudo synchronization detection signal, and
based on the generated particular value, starts generating the pseudo synchronization detection signal at a time at which the synchronization detection signal is enabled.

2. The image forming apparatus of claim 1, wherein at the time at which the synchronization detection signal is enabled, the at least one pseudo synchronization detection signal generation circuit starts generating the pseudo synchronization detection signal to generate the pseudo synchronization detection signal after the particular surface of the rotary polygon mirror makes one revolution.

3. The image forming apparatus of claim 1, wherein the at least one pseudo synchronization detection signal generation circuit includes
a first counter configured to count the period of the synchronization detection signal, and
an arithmetic circuit configured to calculate the particular value based on the previously calculated period of the synchronization detection signal and the period of the synchronization detection signal counted by the first counter.

4. The image forming apparatus of claim 3, wherein the at least one pseudo synchronization detection signal generation circuit further includes
a clock oscillator configured to oscillate a count clock signal for operating the first counter based on the particular value calculated by the arithmetic circuit, and
a second counter configured to count up to a certain value with the count clock signal oscillated by the clock oscillator to generate the pseudo synchronization detection signal.

5. The image forming apparatus of claim 4, wherein the arithmetic circuit calculates a frequency division ratio for dividing a frequency of the count clock signal based on the particular value and a previously calculated frequency division ratio for dividing a frequency of a source oscillation clock signal supplied to the clock oscillator.

6. The image forming apparatus of claim 4, wherein the arithmetic circuit calculates a target value for generating the pseudo synchronization detection signal based on the particular value and a previously calculated target value for generating the pseudo synchronization detection signal, the previously calculated target value being counted by the second counter.

7. The image forming apparatus of claim 1, wherein the rotary polygon mirror includes a plurality of surfaces, and
wherein the at least one pseudo synchronization detection signal generation circuit includes a plurality of pseudo synchronization detection signal generation circuits corresponding to the plurality of surfaces of the rotary polygon mirror.

8. The image forming apparatus of claim 7, wherein each of the plurality of pseudo synchronization detection signal generation circuits generates the pseudo synchronization detection signal for a corresponding one of the plurality of surfaces of the rotary polygon mirror.

9. An image forming apparatus comprising:
a first scanned medium that is scanned with a first optical signal based on first image data;
a second scanned medium that is scanned with a second optical signal based on second image data;
deflecting means for deflecting the first optical signal and the second optical signal;
synchronization detection signal generation means for generating a synchronization detection signal representing a first scanning start time to start scanning the first scanned medium; and
pseudo synchronization detection signal generation means for generating a pseudo synchronization detection signal with the synchronization detection signal, the pseudo synchronization detection signal representing a second scanning start time to start scanning the second scanned medium,
the pseudo synchronization detection signal generation means
based on a previously calculated period of the synchronization detection signal and a period of the synchronization detection signal counted on a particular surface of the deflecting means, generating a particular value for generating the pseudo synchronization detection signal, and
based on the generated particular value, starting generating the pseudo synchronization detection signal at a time at which the synchronization detection signal is enabled.

10. The image forming apparatus of claim 9, wherein at the time at which the synchronization detection signal is enabled, the pseudo synchronization detection signal generation means starts generating the pseudo synchronization detection signal to generate the pseudo synchronization detection signal after the particular surface of the deflecting means makes one revolution.

11. The image forming apparatus of claim 9, wherein the pseudo synchronization detection signal generation means includes
first counting means for counting the period of the synchronization detection signal, and arithmetic means for calculating the particular value based on the previously calculated period of the synchronization detection signal and the period of the synchronization detection signal counted by the first counting means.

12. The image forming apparatus of claim 11, wherein the pseudo synchronization detection signal generation means further includes
   clock oscillating means for oscillating a count clock signal for operating the first counting means based on the calculated particular value, and
   second counting means for counting up to a certain value with the oscillated count clock signal.

13. The image forming apparatus of claim 12, wherein the arithmetic means calculates a frequency division ratio for dividing a frequency of the count clock signal based on the particular value and a previously calculated frequency division ratio for dividing a frequency of a source oscillation clock signal supplied to the clock oscillating means.

14. The image forming apparatus of claim 12, wherein the arithmetic means calculates a target value for generating the pseudo synchronization detection signal based on the particular value and a previously calculated target value for generating the pseudo synchronization detection signal, the previously calculated target value being counted with the second counting means.

15. The image forming apparatus of claim 9, wherein the deflecting means includes a plurality of surfaces, and
   wherein the pseudo synchronization detection signal generation means is provided for each of the plurality of surfaces of the deflecting means.

16. The image forming apparatus of claim 15, wherein the pseudo synchronization detection signal generation means generates the pseudo synchronization detection signal in accordance with the each of the plurality of surfaces of the deflecting means.

* * * * *